United States Patent
Liu et al.

(10) Patent No.: US 11,785,069 B2
(45) Date of Patent: Oct. 10, 2023

(54) SYSTEM AND METHOD FOR CONTENT-ADAPTIVE REAL-TIME VIDEO COMMUNICATION

(71) Applicant: The Research Foundation for The State University of New York, Binghamton, NY (US)

(72) Inventors: Yao Liu, Vestal, NY (US); Shuoqian Wang, Vestal, NY (US)

(73) Assignee: The Research Foundation for The State University of New York, Binghamton, NY (US)

( * ) Notice: Subject to any disclaimer, the term of this patent is extended or adjusted under 35 U.S.C. 154(b) by 0 days.

(21) Appl. No.: 17/449,893

(22) Filed: Oct. 4, 2021

(65) Prior Publication Data

US 2022/0116441 A1  Apr. 14, 2022

Related U.S. Application Data

(60) Provisional application No. 63/090,273, filed on Oct. 11, 2020.

(51) Int. Cl.
*H04L 65/75* (2022.01)
*H04L 65/65* (2022.01)
*H04N 23/698* (2023.01)

(52) U.S. Cl.
CPC .............. *H04L 65/75* (2022.05); *H04L 65/65* (2022.05); *H04N 23/698* (2023.01)

(58) Field of Classification Search
CPC ......... H04L 65/75; H04L 65/65; H04L 65/61; H04L 65/70; H04L 65/752; H04L 65/80; H04L 65/1108; H04N 5/23238
See application file for complete search history.

(56) References Cited

U.S. PATENT DOCUMENTS

| | | | |
|---|---|---|---|
| 2002/0015064 A1* | 2/2002 | Robotham | G06F 3/04883 715/863 |
| 2008/0129844 A1* | 6/2008 | Cusack | H04N 5/23229 348/241 |
| 2013/0342640 A1* | 12/2013 | Li | H04N 19/59 375/240.08 |
| 2014/0282721 A1* | 9/2014 | Kuncl | G06Q 10/10 725/35 |

(Continued)

*Primary Examiner* — Phung-Hoang J Nguyen
(74) *Attorney, Agent, or Firm* — Hoffberg & Associates; Steven M. Hoffberg

(57) ABSTRACT

SphericRTC provides real-time 360-degree video communication, which allows the viewer to observe the environment in any direction from the camera location. This more allows users to more-efficiently exchange information and can be beneficial in the real-time setting. The system selects representations of 360-degree frames to allow efficient, content-adaptive delivery. The system performs joint content and bitrate adaptation in real-time by offloading expensive transformation operations to a GPU. The system demonstrates that the multiple sub-components: viewport feedback, representation selection, and joint content and bitrate adaptation, can be effectively integrated within a single framework. Compared to a baseline implementation, views in SphericRTC have consistently higher visual quality. The median Viewport-PSNR of such views is 2.25 dB higher than views in the baseline system.

18 Claims, 15 Drawing Sheets

(56) References Cited

U.S. PATENT DOCUMENTS

| | | | |
|---|---|---|---|
| 2015/0071363 A1* | 3/2015 | Sun | H04N 19/154 375/240.27 |
| 2020/0382796 A1* | 12/2020 | Wang | H04N 19/119 |
| 2021/0092347 A1* | 3/2021 | Han | H04N 13/282 |
| 2022/0078396 A1* | 3/2022 | Gül | H04L 65/65 |

* cited by examiner

SYSTEM AND METHOD FOR CONTENT-ADAPTIVE REAL-TIME VIDEO COMMUNICATION

CROSS REFERENCE TO RELATED APPLICATIONS

The present application is a non-provisional of, and claims benefit of priority under 35 U.S.C. § 119(e) from, U.S. Provisional Patent Application No. 63/090,273, filed Oct. 11, 2020, the entirety of which is expressly incorporated herein by reference.

GOVERNMENT SUPPORT CLAUSE

This invention was made with government support under grant CNS-1943250 and CNS-1618931 awarded by the National Science Foundation. The government has certain rights in the invention.

FIELD OF THE INVENTION

The present invention relates to the field of context-dependent predictive image stream communication.

BACKGROUND OF THE INVENTION 360-degree videos allow users to navigate recorded scenes in three degrees of freedom (3-DoF). The 360-degree video medium is not only useful for delivering pre-recorded content, but can also allow users to more-naturally experience real-time events, e.g., teleconferencing, telepresence, and human-controlled robotic navigation.

A core challenge in 360-degree video delivery involves delivering the frames required for immersive experience in a bandwidth-efficient way. Current implementations can suffer from both low-quality user-views and high bandwidth consumption. Both drawbacks can be mitigated by reducing the number of transmitted, but unviewed, pixels on 360-degree frames.

A wide range of approaches have been proposed to address wasted bandwidth in the 360-degree video streaming setting. Tiling approaches, e.g., (23, 38), transmit only a subset of the spatial portions of the omnidirectional frame that will be observed by users. Oriented projections (6, 8, 50) attempt to transmit representations with higher pixel densities in regions likely to be viewed by users. Both tiling and oriented projection approaches require accurate predictions of the users' view-orientation to operate effectively. In the on-demand streaming setting, many such prediction approaches have been proposed (23, 36, 38, 44, 45).

Bandwidth-efficient operation in the real-time 360-degree video communication setting is significantly more challenging than in the on-demand streaming settings. In the real-time setting, much less time is available to convert collected 360-degree segments to more efficient tile-based or oriented projection segments. In addition, given that new content is generated on-the-fly, traces of view orientations from many users over a single sequence of video frames cannot be used to predict the current user's view.

360-degree videos present users with omnidirectional content, allowing them to freely explore all orientations emanating from the camera position. To effectively transmit 360-degree videos, the omnidirectional content is first projected onto a 2D plane. While many projection schemes exist, the equirectangular projection (11) is the one that is simplest and most widely used. Transmitting 360-degree video streams typically include full omnidirectional frames. However, although all pixels in the omnidirectional frame would be transmitted, only the portion in the field of view (FoV) is rendered and displayed to the viewer. This results in a large number of wasted (i.e., unviewed) pixels. 360-degree video viewing devices' FoVs are typically between 90° and 120°. To illustrate the amount of wasted bandwidth, rendering a 1000×1000 FoV requires only approximately 15% of pixels on an equirectangular frame. A direct consequence of wasted bandwidth is bad visual quality of the rendered views. For example, suppose the available network bandwidth can support streaming of an equirectangular-projected video of 1080p, the effective resolution of rendered views is only equivalent to 480p or even 360p.

To address the bandwidth inefficiency, a number of solutions have been proposed to reduce the wasted data in the on-demand and live video streaming settings. These approaches include tiling (21-23, 28, 33, 35, 37, 38, 43, 44, 49) and oriented projections (6, 8. 50). The high-level idea is to prepare representations of the 360-degree videos such that it is possible to only transmit data within predicted viewport in high quality.

Real-time video communication is widely used for online video chatting and video conferencing. Services such as Apple's FaceTime, Google Hangouts, and Zoom allow video streams to be transmitted with hundreds of milliseconds round-trip time (46, 48). Developers can also leverage the open-source WebRTC framework (13) to add real-time video communication capabilities to their applications on various platforms.

Real-time video communication, however, should be differentiated from the term "live video streaming". In "live streaming", broadcaster-to-viewer latency is on the order of tens of seconds (31, 47). For example, Liu et al. found that the median broadcaster-to-viewer latency of 360-degree live streaming is 37.1 seconds on YouTube and 18.7 seconds on Facebook (31). With less stringent latency requirements, live video streaming can take advantage of per-segment encoding (batching a few seconds of video before encoding) and reliable TCP-based transmission. On the other hand, for real-time video communication, captured video frames should be encoded and transmitted as soon as possible without batching.

A key challenge with real-time video communication is the ultra-low latency required by interactive video, which helps create the illusion that the video receiver is located in the same place as the video collector. To do so, collected video frames are encoded and then transmitted via the real-time transport protocol (RTP) (39) typically over the UDP transport layer protocol.

WebRTC is an open-source framework for real-time video communication (13). When transmitting videos over WebRTC, the video collector encodes frames in RTP packets. The video receiver records information about every RTP packet it receives and transmits the information in a real-time transport control protocol (RTCP) message (Transport-wide Feedback) back to the video collector. The bandwidth controller at the video collector calculates metrics such as inter-packet delay variation, queuing delay, and packet loss. These metrics are then used to compute the target sending bitrate for transmitting video content to the video receiver (3, 5). The frame encoder then uses this target sending bitrate to adjust the quantization parameter (qp). This qp parameter is further used by the bandwidth controller. The bandwidth controller adjusts target resolution of captured frames so that transmitted frames more-closely match the target sending bitrate. To dynamically adapt the video's sending bitrate based on the network conditions, the bandwidth controller adjusts the estimated bandwidth/target sending bitrate, target resolution of transmitted video streams based on network statistics collected from the video receiver. Separate from the main audio/video stream, WebRTC can also be used to set up a data channel using the stream control transmission protocol (SCTP) (4).

Vanilla WebRTC (unmodified) does not provide special support for 360-degree videos. To provide real-time communication, 360-degree videos have to be treated the same way as traditional 2D videos. For example, consider a 360-degree camera connected to a video collector computer via a wired connection, the camera outputs video frames in the equirectangular projection. These equirectangular-projected frames will be encoded and transmitted by WebRTC via the secure real-time transport protocol (SRTP) (2). During transmission, target sending bitrate of the video collector/sender will be adapted based on the delay and packet loss feedback from the receiver (17).

Real-time 360-degree video communication has many practical use cases. For example, Heshmat et al. set up a telepresence robot that can deliver 360-degree videos to a remote viewer via WebRTC to provide shared outdoor activity experiences (29). Ha et al. proposed a telepresence wheelchair with 360-degree views delivered over WebRTC (27). Researchers have developed systems enabling other types immersive media communication, such as virtual reality (VR) conferencing, in real-time (24-26). For example, in (25), Gunkel et al. used an RGB-D camera to capture photo-realistic representations of users. They developed a system to transmit the captured representations via WebRTC to remote VR conference participants.

To support 360-degree live streaming, researchers have proposed solutions for improving stitching performance and encoding performance. For example, Chen et al. designed LiveTexture that uses an event-driven stitching algorithm for tiled 360-degree video streaming (18), and Lee et al. proposed foveated 360-degree video stitching (30). Ballard et al. proposed RATS that uses GPU-based hardware encoder for encoding tiled 360-degree videos (16). Midoglu et al. proposed a framework that leverages RATS for evaluating 360-degree video streaming performance (34). These works focus on improving the stitching and encoding performance, while we focus on improving the quality of user-observed views by transforming and transmitting 360-degree video frames in adaptive representations.

Recently, Shi et al. proposed Freedom to support bandwidth-efficient delivery of VR content, including 360-degree videos, from nearby mobile edge cloud (MEC) servers (40). To save bandwidth, the MEC server generates and encodes Visible Area with Margin (VAM) frames on the GPU. These VAM frames contain only part of an omnidirectional frame, meaning that portions of the user view outside of the VAM will not be rendered correctly. A main drawback with this solution, however, is that a large percentage of pixels on the equirectangular-projected frame is not viewed, causing wasted bandwidth and low quality of rendered views.

SUMMARY OF THE INVENTION

The present invention, whose preferred embodiment is called "SphericRTC", achieves bandwidth efficiency and improves view quality by using content-adaptive oriented projections. SphericRTC has improved performance with respect to an unmodified ("vanilla") WebRTC baseline in evaluation.

A practical end-to-end real-time 360-degree video communication system is provided, which applies a combination of computational tools and algorithms to achieve bandwidth-efficient streaming in the real-time setting. SphericRTC achieves bandwidth efficiency and improves view quality by processing raw segments into content-adaptive oriented projections. To perform this adaptation step in real-time, SphericRTC preferably offloads these transformations to a graphic processing unit (GPU). While use of a GPU is not imperative in all embodiments, the required transforms execute efficiently in a single-instruction, multiple data (SIMD) environment.

An oriented projection approach is provided toward 360-degree content adaptation suitable for real-time processing. This approach includes a strategy for selecting the best oriented projection parameters for a given real-time adaptation bitrate.

The simple approach of using the most-recent reported user orientations is typically effective for generating frame representations for high-quality views. This approach is effective due to the low latency between reporting user's view orientation and consumption of the generated frames.

A CUDA (Compute Unified Device Architecture, see en.wikipedia.org/wiki/CUDA) library is available to create adaptive representations in real-time and integrate this library into the SphericRTC framework. CUDA operates on certain nVidia graphics processing units (GPU), which are single-instruction multiple data (SIMD) parallel processors. These SIMD processors excel at performing mathematical transformations and other matrix array processing.

The complete system integrates viewport feedback, adaptation and transformation components. This integration demonstrates that managing information flow from video receiver to the video collector and between prediction and adaption components are possible in a practical system.

Results from extensive experiments show that SphericRTC consistently outperforms a baseline system: The median Viewport-PSNR of views rendered in SphericRTC is 2.25 dB higher than the views rendered in the baseline system.

It is therefore an object to provide a real-time content-adaptive video communication system, comprising: an input port configured to receive an image stream; a communication port interfacing with a communication network having a communication latency, configured to: transmit an oriented projection viewport of the image stream comprising viewed pixels and unviewed pixels by a remote user, the oriented projection viewport being a subset of information in the image stream, and receive information defining a focus within the image stream based on a previously transmitted portion of the image stream; and an automated processor, configured to: analyze the received information defining the focus; predict the oriented projection viewport within the image comprising the defined focus, comprising prediction of the viewed pixels and the unviewed pixels; and adaptively selectively prioritize transmission of predicted viewed pixels over predicted unviewed pixels of the predicted oriented projection viewport of the image stream through the communication port dependent on at least a real-time communication latency constraint.

It is another object to provide a real-time content-adaptive video communication method, comprising: receiving an image stream comprising a series of images; receiving information from a user defining a focus within an image of the image stream through a communication port interfacing with a communication network, based on a previously transmitted portion of the image stream subject to a communication latency; automatically analyzing the received information from the user defining the focus, to predict an oriented projection viewport within the image comprising the defined focus; and transmitting the predicted oriented projection viewport of the image stream through the communication port, which adaptively selectively prioritizes transmission of viewed portions of the predicted oriented projection viewport of the image stream in preference to unviewed portions of the predicted oriented projection viewport of the image stream.

It is a further object to provide a computer readable medium comprising instructions for controlling real-time content-adaptive video communications, comprising: instructions for receiving an image stream; instructions for receiving information defining a focus within an image of the image stream through a communication port interfacing with a communication network, based on a previously transmitted portion of the image stream subject to a communication latency; instructions for analyzing the received information defining the focus, to predict viewed pixels and unviewed pixels of the oriented projection viewport within the image comprising the defined focus and define an optimized oriented projection viewport of the image stream; and instructions for adaptively selectively transmitting the optimized oriented projection viewport prioritizing predicted viewed pixels over predicted unviewed pixels through the communication port dependent on at least a real-time communication latency constraint.

The image stream may comprise a panoramic image, comprising an object of interest, and wherein the focus corresponds to the object of interest.

The automated processor may be further configured to implement an inertial model to predict changes in the oriented projection viewport.

The communication port may operate according to an Internet protocol, e.g., TCP, or UDP. The communication port may be controlled using WebRTC. The communication port may have a real-time adaptive bitrate.

The focus may be a user-desired focus, and the automated processor may be configured to model the image stream, and to predict the user desired focus based on received information defining a prior actual focus. The automated processor may be configured to predict a user desired focus based on received information defining a prior user focus. The received information represents an incremental change in user attention.

The transmitted oriented projection viewport may comprise an image object, and the automated processor is further configured to adaptively control transmission of a higher image area bit density corresponding to the image object and a lower image area bit density away from the image object.

The automated processor may be further configured to selectively adaptively allocate image bits in the transmitted oriented projection viewport to areas close to a target pixel-concentration orientation associated with the focus.

The automated processor may be further configured to selectively adaptively transmit image bits proximate to a target pixel-concentration orientation in a spheric or elliptic projection.

The automated processor may be further configured to selectively adaptively define at least one of an image resolution and an image bit depth of portions of the oriented projection viewport.

The automated processor may adaptively allocates pixels in respective video frames to represent a selected target pixel-concentration area in preference to other areas in the video frames to predict the oriented projection viewport of the image stream.

The automated processor may be further configured to implement a video encoder, having a bandwidth controller with a target resolution and an adaptively adjusted content-dependent quantization parameter selected to respond to an offset magnitude chosen such that a pixel-concentration area's pixel density matches a pixel density of a camera-supplied frame, which has a degraded density away from the pixel concentration area if the bandwidth controller changes the target resolution.

The image stream may comprise an image in a spheric or elliptic projection, and the automated processor may be further configured to transform a portion of the image comprising the oriented projection viewport from the spheric or elliptic projection to the oriented projection viewport of the image. The transform may be implemented using a parallel processor, e.g., a single-instruction, multiple-data (SIMD) processor such as a graphics processing unit.

The transmission of the predicted oriented projection viewport of the image stream may comprise a header comprising data defining yaw, pitch, and roll.

The image stream may comprise an image in an offset spherical projection parameterized by an offset vector $\vec{d}, \|\vec{d}\| \in [0,1)$ which describes the offset spherical projection's pixel-concentration direction, each pixel being represented by a unit vector $\vec{p}$ from the center of a sphere to the pixel position, all pixels on the sphere being offset by $\vec{d}$ by applying $$\vec{p}' = \frac{\vec{p} - \vec{d}}{\|\vec{p} - \vec{d}\|},$$

creating a normalized vector $\vec{p}'$, wherein the automated processor is further configured to reproject pixels to new locations on the sphere, to obtain a new sphere, and to project pixels on the new sphere to a 2D plane using an equirectangular projection, an angle between a pixel vector $\vec{p}$ on the sphere and the offset vector $\vec{d}$ is θ, and after applying the offset, the angle between the new vector $\vec{p}'$ and the offset vector is $$f(\theta) = \arctan \frac{\sin\theta}{-\|\vec{d}\| + \cos\theta},$$

θ has an offset direction selected to match a viewer's predicted future view orientation, and the offset vector has an offset magnitude adaptively selected based on a resolution of the image stream, and a target resolution selected by a bandwidth controller.

It is also an object to provide a real-time content-adaptive video communication system, comprising: an input port configured to receive an image stream; a communication port interfacing with a communication network having a communication latency, configured to transmit an oriented projection viewport of the image stream, and receive information defining a focus within the image based on a previously transmitted portion of the image stream subject to the communication latency; and an automated processor, configured to analyze the received information defining the focus, predict the viewport within the image comprising the defined focus, and control transmission of the oriented projection viewport of the image stream through the communication port.

It is also an object to provide a real-time content-adaptive video communication method, comprising: receiving an image stream; receiving information defining a focus within an image of the image stream through a communication port interfacing with a communication network, based on a previously transmitted portion of the image stream subject to a communication latency; automatically analyzing the received information defining the focus, to predict the viewport within the image comprising the defined focus; and transmitting an oriented projection viewport of the image stream through the communication port.

It is a still further object to provide a computer readable medium comprising instructions for controlling real-time content-adaptive video communications, comprising: instructions for receiving an image stream; instructions for receiving information defining a focus within an image of the image stream through a communication port interfacing with a communication network, based on a previously transmitted portion of the image stream subject to a communication latency; instructions for analyzing the received information defining the focus, to predict the viewport within the image comprising the defined focus; and instructions for transmitting an oriented projection viewport of the image stream through the communication port.

The image stream may comprise a 360° image. The image stream may comprise a panoramic image. The image stream may comprise an object of interest, and wherein the focus corresponds to the object of interest.

The focus may comprise a point within the image.

The automated processor may comprise an inertial model to predict changes in the viewport.

The communication port may be configured to communicate TCP, UDP, or RDP packets. For example, the communication port may operate according to an Internet protocol, i.e., transmits TCP/IP packets.

The communication port may be controlled with WebRTC. The communication port may be controlled with SphericRTC.

The communication port may have a real-time adaptive bitrate.

The automated processor may be configured to model the image stream, and to predict a user desired focus based on latency delayed received information defining a prior actual focus.

The automated processor may be configured to predict a user desired focus based on received information defining a prior user focus.

The received information may represent an incremental change in user attention.

The received information may represent a reported view orientation.

The automated processor may be configured to adapt communication through the communication port dependent on communication network statistics.

The viewport may comprise viewed pixels and unviewed pixels by a remote user, and automated processor is configured to predict the viewed pixels and the unviewed pixels, and to adaptively selectively transmit predicted viewed pixels.

The communication port may be controlled with WebRTC modified to receive a viewport feedback parameter.

The automated processor may be further configured to selectively adaptively allocate image bits in the transmitted oriented projection viewport to areas close to a target pixel-concentration orientation. The automated processor may be configured to selectively adaptively allocate transmitted image bits to areas close to a target pixel-concentration orientation in the spheric or elliptic projection. The automated processor may be configured to selectively adaptively define an image resolution of portions of the viewport. The automated processor may be configured to selectively adaptively define an image bit depth of portions of the viewport.

The oriented projection viewport of the image stream may adaptively allocate pixels in respective video frames to represent a selected target pixel-concentration area in preference to other areas in the video frames.

The processor may be configured to implement a video encoder, having a bandwidth controller with a target resolution and an adaptively adjusted content-dependent quantization parameter selected to respond to an offset magnitude chosen such that a pixel-concentration area's pixel density matches a pixel density of a camera-supplied frame, which has a degraded density away from the pixel concentration area if the bandwidth controller changes the target resolution.

The image stream may comprise an image in a spheric or elliptic projection, and the processor may be configured to transform a portion of the image comprising the viewport from the spheric or elliptic projection to the oriented projection viewport of the image.

The automated processor may comprise a graphic processing unit and an arithmetic logic unit, and the transform is performed in the graphics processing unit.

The automated processor may comprise a single instruction, multiple data processor, and the transform is performed on the single instruction, multiple data processor.

The automated processor may be configured to control transmission of the oriented projection viewport within a predefined latency from receipt of the image stream comprising the image in the spheric or elliptic projection.

The image stream may comprise an image in an offset spherical projection, parameterized by an offset vector $\vec{d}, \|\vec{d}\| \in [0,1)$ which describes the offset spherical projection's pixel-concentration direction, each pixel being represented by a unit vector $\vec{p}$ from the center of a sphere to the pixel position, all pixels on the sphere being offset by $\vec{d}$ by applying $$\vec{p}' = \frac{\vec{p} - \vec{d}}{\|\vec{p} - \vec{d}\|},$$

creating a normalized vector $\vec{p}'$.

The automated processor may be configured to reproject pixels to new locations on the sphere, to obtain a new sphere, and to project pixels on the new sphere to a 2D plane using a equirectangular projection.

The angle between a pixel vector $\vec{p}$ on the sphere and the offset vector $\vec{d}$ is $\theta$, and after applying the offset, the angle between the new vector $\vec{p}'$ and the offset vector may be $$f(\theta) = \arctan \frac{\sin\theta}{-\|\vec{d}\| + \cos\theta}.$$

θ may have an offset direction selected to match a viewer's predicted future view orientation. The viewer's predicted future view orientation may be the viewer's current view orientation. The offset vector may have an offset magnitude adaptively selected based on a resolution of the image stream, and a target resolution selected by a bandwidth controller.

The automated processor may be configured to transmit an offset direction.

The image stream may comprise an image in a spherical projection having an offset magnitude of 0. The image stream may comprise an image in an offset spherical projection having a non-zero offset magnitude. The image stream may comprise a panoramic image in a cubemap projection, having a discontinuous projection onto a 2D rectangular plane.

The automated processor may have a processing latency of less than 16.67 mS, or less than 11 mS.

The automated processor may be configured to receive an offset direction determination parameter to choose a viewport offset direction based on feedback from a remote video receiver.

The communication network may communicate using RTP packets, having a RTP header extension. The RTP header extension may comprise data defining yaw, pitch, and roll.

The method may further comprise employing an inertial model to predict changes in the viewport.

The method may further comprising modelling the image stream, and to predicting a user desired focus based on latency delayed received information defining a prior actual focus.

The method may further comprising predicting a user desired focus based on received information defining a prior user focus.

The method may further comprise adapting communications through the communication port dependent on communication network statistics.

The viewport may comprise viewed pixels and unviewed pixels by a remote user, and the method further comprising predicting the viewed pixels and the unviewed pixels, and to adaptively selectively transmitting predicted viewed pixels.

The method may further comprise selectively adaptively allocating image bits in the transmitted oriented projection viewport to areas close to a target pixel-concentration orientation.

The method may further comprise selectively adaptively allocating transmitted image bits to areas close to a target pixel-concentration orientation in the spheric or elliptic projection.

The method may further comprise selectively adaptively defining an image resolution of portions of the viewport.

The method may further comprise selectively adaptively defining an image bit depth of portions of the viewport.

The method may further comprise providing a video encoder, having a bandwidth controller with a target resolution and an adaptively adjusted content-dependent quantization parameter selected to respond to an offset magnitude chosen such that a pixel-concentration area's pixel density matches a pixel density of a camera-supplied frame, which has a degraded density away from the pixel concentration area if the bandwidth controller changes the target resolution.

The image stream may comprise an image in a spheric or elliptic projection, the method further comprising transforming a portion of the image comprising the viewport from the spheric or elliptic projection to the oriented projection viewport of the image.

The transforming may be performed with an automated processor comprising a graphic processing unit and an arithmetic logic unit, and the transform may be performed in the graphics processing unit.

The transforming may be performed with an automated processor comprising a single instruction, multiple data processor, and the transform may be performed on the single instruction, multiple data processor.

The method may further comprise controlling transmission of the oriented projection viewport within a predefined latency from receipt of the image stream comprising the image in the spheric or elliptic projection.

The method may further comprise reprojecting pixels to new locations on the sphere, to obtain a new sphere, and projecting pixels on the new sphere to a 2D plane using a equirectangular projection.

The method may further comprise transmitting an offset direction.

The transform may be implemented by a processor having a processing latency of less than 16.67 mS or less than 11 mS.

The method may further comprise receiving an offset direction determination parameter to choose a viewport offset direction based on feedback from a remote video receiver.

DETAILED DESCRIPTION OF THE PREFERRED EMBODIMENTS

Overview of SphericRTC

SphericRTC's design involves transforming the video content in a way that reduces communication of unviewed pixels. In the real-time setting, this transformation must take place within a tolerable frame delivery threshold. Spheric- RTC performs this content adaptation using i) the most recently reported view-orientation and ii) a bitrate adaptation decision derived from network statistics.

Figure 1:
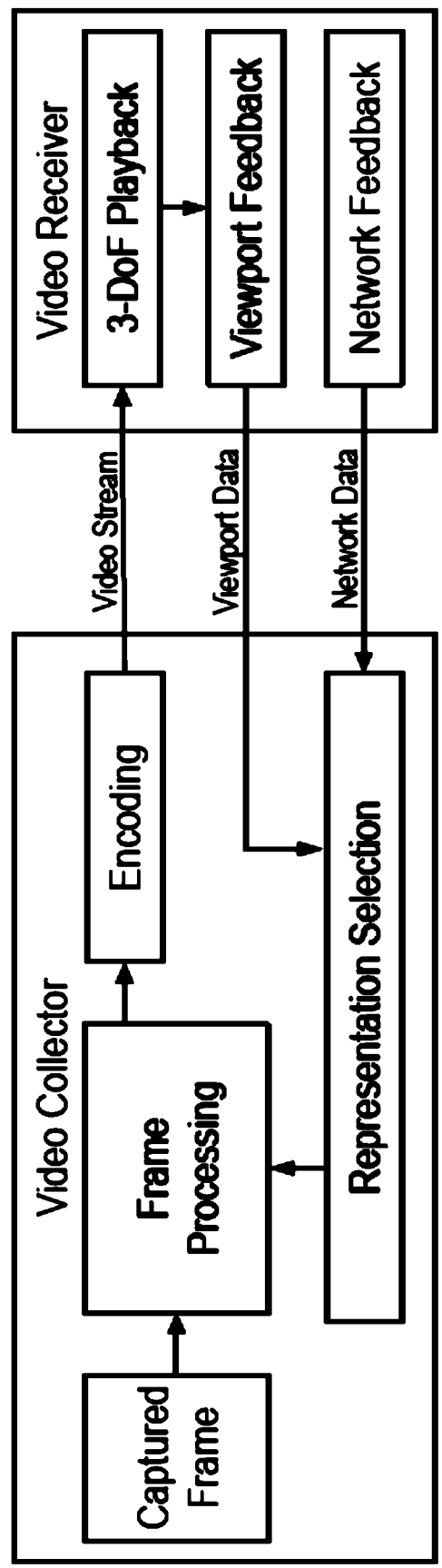
FIG. 1 shows a high-level design of SphericRTC. The grey-shaded boxes show components added or modified by SphericRTC from the original WebRTC implementation.

FIG. 1 provides an overview of SphericRTC components. Internally, SphericRTC is built on top of WebRTC. With vanilla WebRTC, the video collector transmits video stream to the video receiver, and the video receiver reports network statistics back to the video collector to perform bitrate adaptation. To enable content adaptation, in SphericRTC, the video receiver reports back the additional "Viewport Feedback", i.e., the user's view orientations while consuming the 360-degree video stream, to the video collector.

In the "Representation Selection" component, content-bitrate adaptation decisions are made based on collected network statistics and users' viewing data. For content adaptation, SphericRTC uses oriented projections for representing 360-degree video frames. Oriented projections devote more pixels in the projected frame to areas on the sphere close to a target pixel-concentration orientation. Decisions made by the "Representation Selection" component are forwarded to the "Frame Processing" component, which spatially transforms the camera-captured frame into representations with different pixel-concentration areas and frame resolutions.

The "Representation Selection" component makes adaptation decisions by choosing appropriate oriented projection parameters. Selected per-frame projection parameters are synchronized with the video receiver.

Analysis of Oriented Projections

An "oriented projection" uses more pixels on the video frame to represent a selected target pixel-concentration area than other areas in the frame (50). After transformation to an oriented projection, the frame will appear as if it "magnifies" the content near the pixel-concentration direction. When the user's view is near this target orientation, views rendered from oriented frames will be of higher quality compared to views from a standard projection of the same resolution. However, views farther away from the target orientation can be in lower quality compared to views from a comparable standard projection. The offset spherical projection is used to create oriented projections in SphericRTC.

Offset Spherical Projection

The offset spherical projection can be parameterized by a single offset vector $\vec{d}, \|\vec{d}\| \in [0,1)$.

This offset vector describes the oriented projection's pixel-concentration direction.

An offset projection can be created starting with pixels from a 360-degree video frame are mapped to the surface of a unit sphere.

Figure 2:
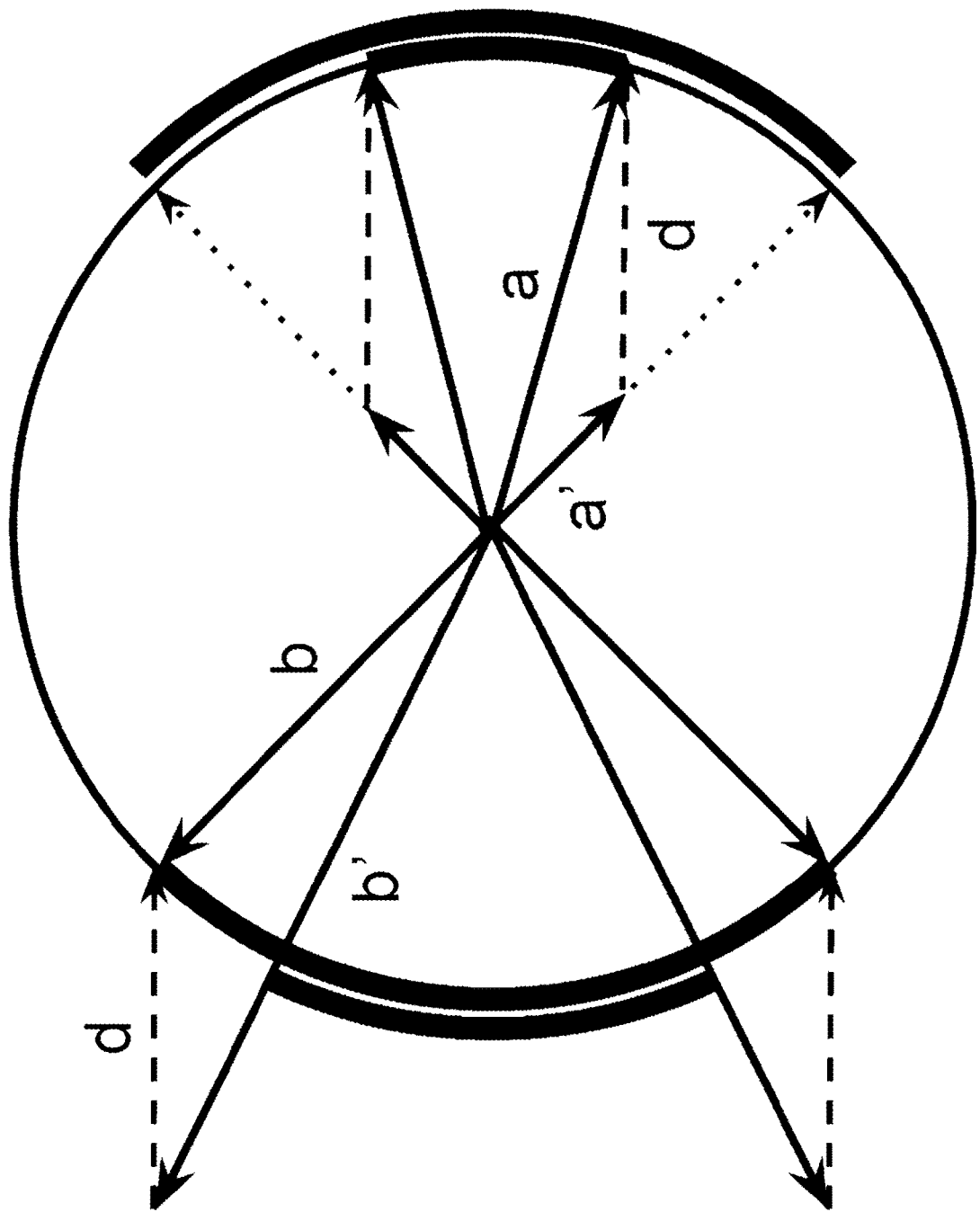
FIG. 2 shows an illustration of the Offset Spherical Projection.

Each pixel can be represented by a unit vector $\vec{p}$ (i.e., $\|\vec{p}\|=1$) from the center of the sphere to the pixel position. All pixels on the sphere are "offset" by $\vec{d}$ by applying the following transformation:

$$\vec{p}' = \frac{\vec{p} - \vec{d}}{\|\vec{p} - \vec{d}\|},$$

creating a new (normalized) vector, $\vec{p}'$. FIG. 2 illustrates how the offset vector $\vec{d}$ is applied to pixels on a sphere.

Figure 3A:
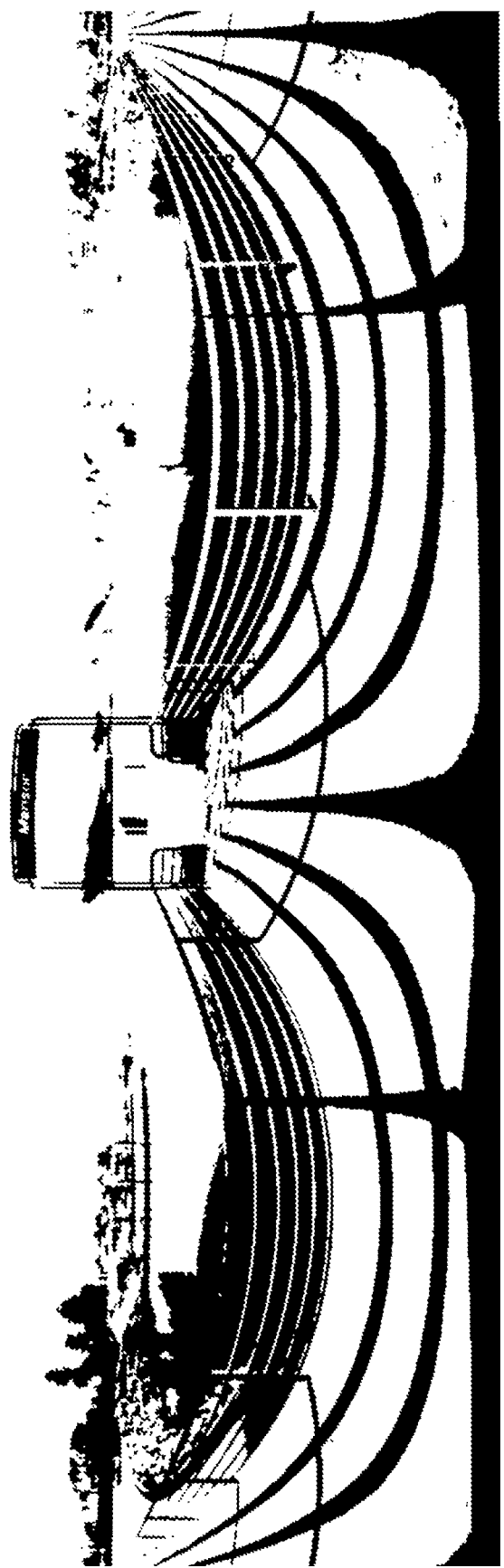
FIGS. 3A-3D show that by applying offsets with different magnitudes, contents near the frame center are magnified to different levels.
Figure 3B:
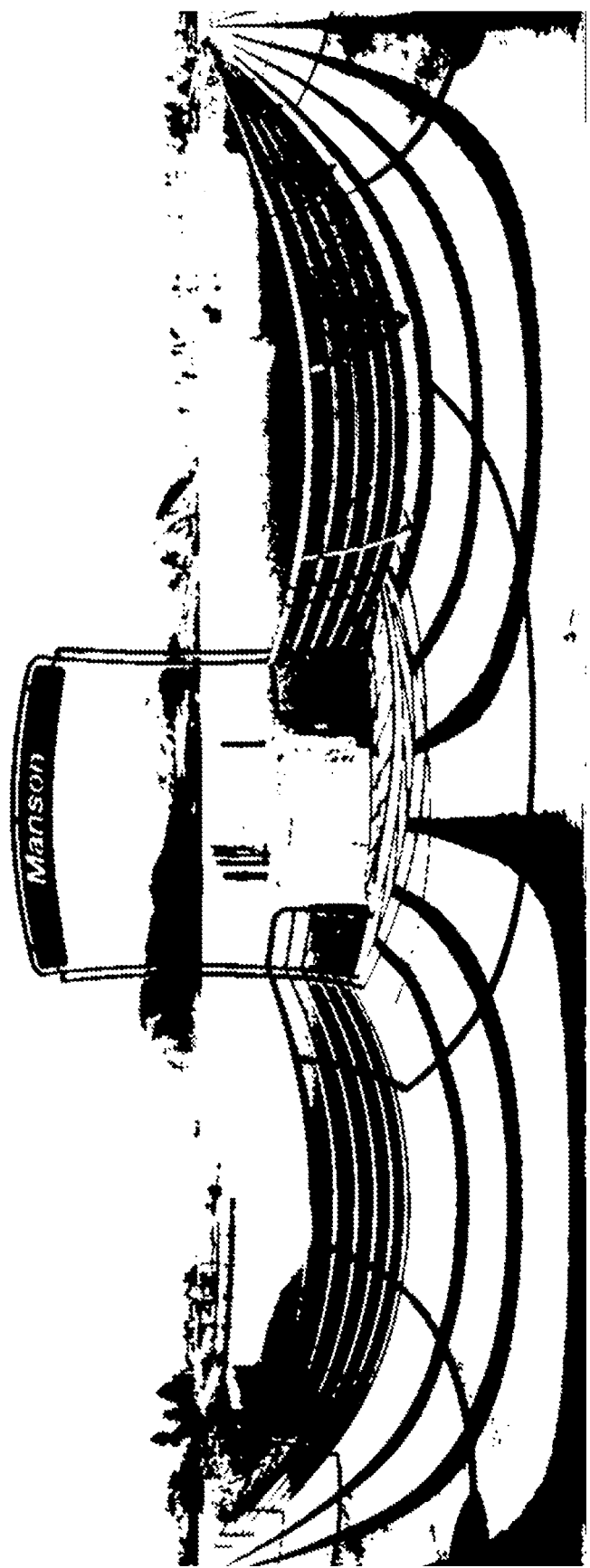
Figure 3C:
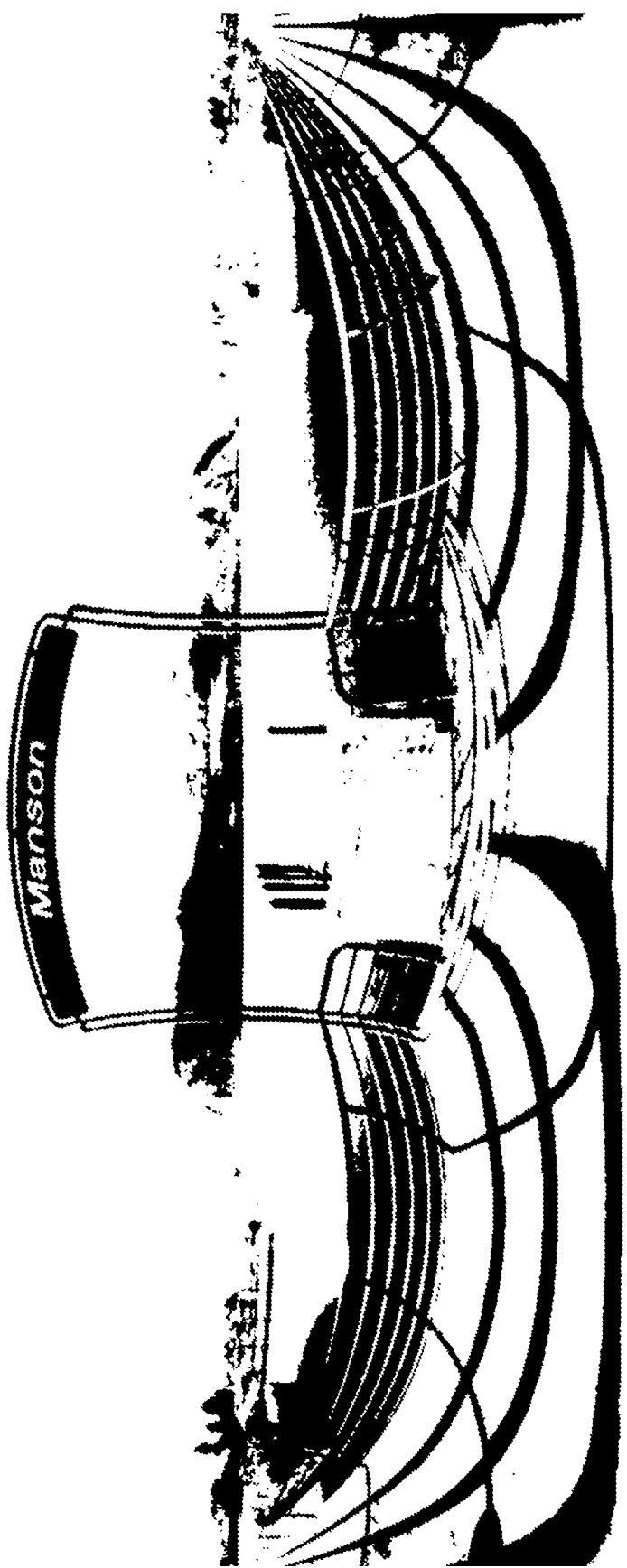
Figure 3D:
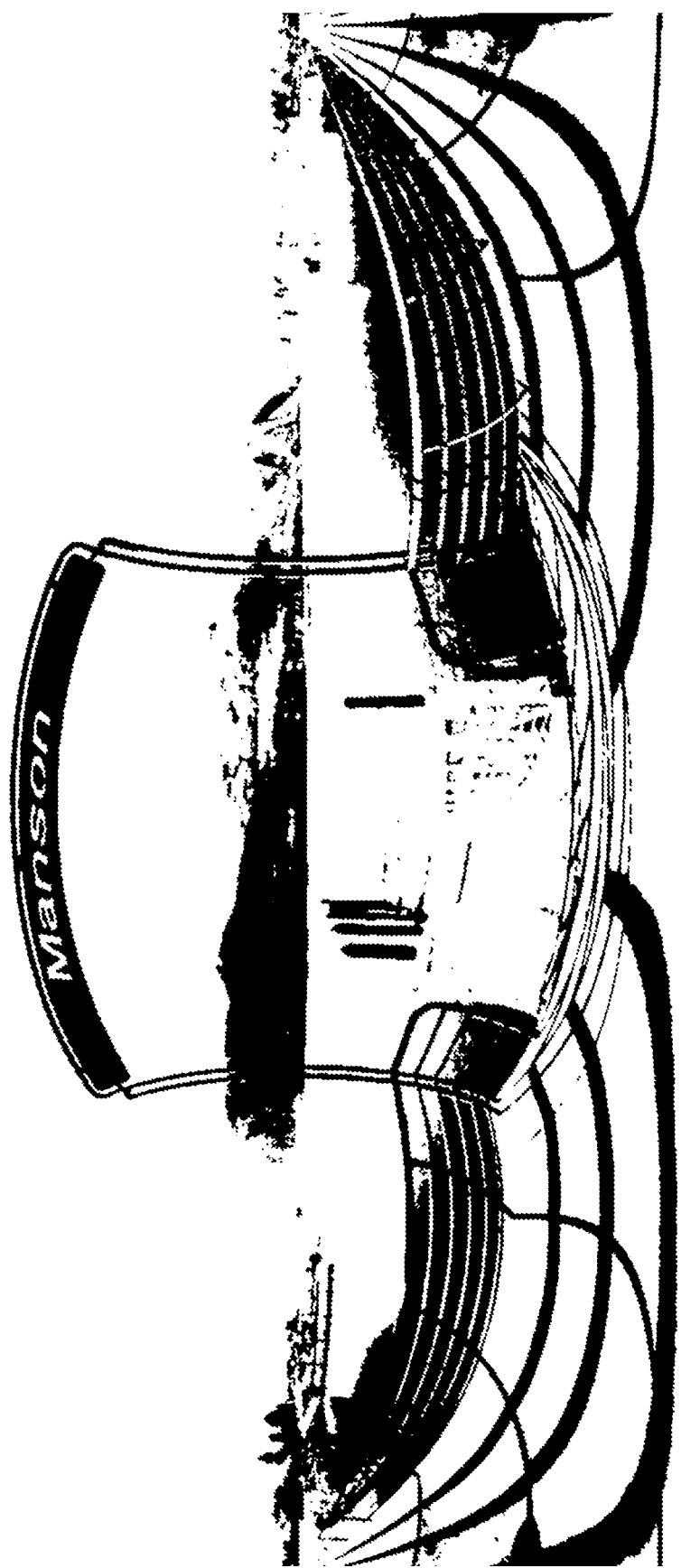

As pixels are re-projected to new locations on the sphere, a new sphere is obtained. Pixels can then be projected on the new sphere to a 2D plane, e.g., using the equirectangular projection, for 2D video encoding. FIG. 3A shows an original equirectangular-projected frame with no offset applied. FIGS. 3B, 3C, and 3D show the resulting offset equirectangular projections after applying offset vectors with different magnitudes.

Magnification Analysis

By applying the offset, content on the sphere near the offset direction will be magnified. In FIG. 2, red-tinted pixels represent magnified areas of the sphere while content in the blue-tinted pixels indicate areas of the sphere that were reduced to occupy smaller areas.

Assuming that the angle between a pixel vector $\vec{p}$ on the sphere and the offset vector $\vec{d}$ is $\theta$, then after applying the offset, the angle between the new vector $\vec{p}'$ and the offset vector becomes:

$$f(\theta) = \arctan \frac{\sin\theta}{-\|\vec{d}\| + \cos\theta} \quad (1)$$

Consider a small FoV of 2·Δ, the magnified FoV will become $2 \cdot \Delta' = 2 \cdot (f(\theta+\Delta) - f(\theta))$. The magnifying value may be calculated as:

$$\frac{\Delta'}{\Delta} = \frac{f(\theta+\Delta) - f(\theta)}{f(\Delta) - f(0)} \quad (2)$$

Per-pixel magnification can be thus approached by (3), which can be calculated as the derivative of $f(\theta)$ as (4):

$$\lim_{\Delta \to 0} \frac{f(\theta + \Delta) - f(\theta)}{\Delta} \quad (3)$$

$$g(\theta) = f'(\theta) = \frac{\frac{\cos\theta}{-\|\vec{d}\| + \cos\theta} + \left(\frac{\sin\theta}{-\|\vec{d}\| + \cos\theta}\right)^2}{1 + \left(\frac{\sin\theta}{-\|\vec{d}\| + \cos\theta}\right)^2} \quad (4)$$

In this function, the greatest value is at ($\theta=0$), i.e., when the pixel is in the same direction as the offset vector $\hat{d}$, and the maximum magnification can be calculated as:

$$g(0) = \frac{1}{-\|\vec{d}\| + 1} \quad (5)$$

Joint Content and Bitrate Adaptation

Using offset projections for content adaptation requires determination of the best offset vector, $\vec{d}$, for transforming the 360-degree content. Furthermore, $\vec{d}$ can be represented as the product of a unit vector, $\vec{o}$ (the offset direction), pointing from the center of the sphere to a point on the spherical surface, and a scalar, $m \in [0,1]$ (the offset magnitude), representing the magnitude of the offset vector. That is, $\vec{d} = m \cdot \vec{o}$. The content adaptation task then becomes two tasks: selection of offset direction and selection of offset magnitude.

Offset Direction Determination.

Content magnification is maximal in the pixel-concentration direction pointed by the offset vector. Therefore, to maximize the visual quality of views rendered at the video receiver's side, the offset direction should be selected to match the viewer's future view orientation. Typically, a prediction algorithm would be used to predict the future orientation. Here, real-time video communication allows taking advantage of the ultra-low end-to-end latency. Given that the view orientation will not change too drastically during a small time-period, a simple approach is proposed that predicts view orientation of a future frame as the most recent received view orientation from the video receiver. This predicted view orientation is then used as the offset direction for adapting the frame content.

Offset Magnitude Determination.

To select the best offset magnitude, the bitrate adaptation decision made by the WebRTC bandwidth controller is taken into account. The bandwidth controller adjusts the target resolution according to the quantization parameter qp returned from encoder, and qp is adjusted based on the content to be encoded and the target bitrate selected by the bandwidth controller. The content adaptation selects an appropriate offset magnitude whenever the target resolution changes. This offset magnitude is chosen such that the pixel-concentration area's pixel density matches the pixel density of the camera-supplied frame. That is, the approach fixes the pixel density in the concentration area and degrades densities away from the concentration area if the bandwidth controller changes the target resolution.

The select offset magnitude is adaptively selected based on the following quantities: (1) the resolution of the captured frame, i.e., the frame provided by the 360-degree camera, and (2) the target resolution selected by the bandwidth controller. If the estimated bandwidth allows frames in the original resolution to be transmitted, then no content magnification is permitted, and the offset magnitude should be set to 0. The following equation is used to determine the offset magnitude:

$$m = \|\vec{d}\| = 1 - \frac{1}{g(0)} = 1 - \max\left(\frac{w'}{w}, \frac{h'}{h}\right) \quad (6)$$

Here, w' and h' represent the width and height of the target resolution selected by WebRTC's bandwidth controller. w and h represent the width and height of the original resolution of frame provided by the video collector's 360-degree camera. Note that this equation assumes that the original, camera-supplied frame and the adapted frame use the same underlying base spherical projection, e.g., the equirectangular projection. If not, w and h need to be adjusted accordingly.

To summarize, the "Representation Selection" component in SphericRTC makes adaptation decisions based on both the predicted view orientation (for using as the offset direction) and the target resolution selected by WebRTC's bandwidth controller (for selecting the offset magnitude). This dependence of offset magnitude on target bitrate is a form of joint adaptation.

Transmitting Offset Direction to the Receiver

As the video collector makes decisions regarding the bitrate adaptation and the content adaptation, the video receiver must also understand how to correctly render received frames in the offset projections. While the offset magnitude can be inferred from the received frame's resolution, one must know the offset direction used for creating the offset projection in order to correctly render views at the video receiver side.

Unlike on-demand and live streaming where video receivers request video segments that are pre-encoded and can contain one or a few seconds of video content, in real-time communication, frames are encoded and sent frame-by-frame to the receiver. As a result, out-of-band transmission of metadata, e.g., the media presentation description (MPD) document used in on-demand and live streaming, is not feasible in real-time scenario.

Instead, an in-band solution is chosen, sending the offset direction information with each frame. In this way, the video receiver can extract required information needed for view rendering from the received frame directly.

Other Considerations

Once the "Representation Selection" component has determined the parameters of the offset projection to encode, the "Frame Processing" component will apply the transformation to the frame captured from the 360-degree camera accordingly. SphericRTC uses the equirectangular projection as the underlying mapping of spherical pixels to the 2D frame. This design choice is based on the following reasons:

First, many 360-degree cameras natively output the equirectangular frames. Thus, the original, camera-supplied frame may be represented as a special case of the offset equirectangular projection, i.e., with the offset magnitude being 0. In this way, no frame transformation is needed if the network bandwidth is sufficient for transmitting the frame in its camera-supplied resolution.

Second, if other spherical projections are used, such as the cubemap projection, the projected content on the 2D rectangular plane may no longer be continuous. Content discontinuity may negatively affect the quality of encoded pixels under a same target encoding bitrate. For example, the cubemap projection projects pixels on a sphere onto six faces of a cube. However, even with the "baseball layout" (20), the boundary between top and bottom portions of the projection is not continuous. Discontinuous content makes it more difficult for the encoder to find similar blocks within the frame to copy from, and thus requires more bits to encode to a same quality.

Implementation

SphericRTC is implemented based on the open-source framework, WebRTC.

Figure 4:
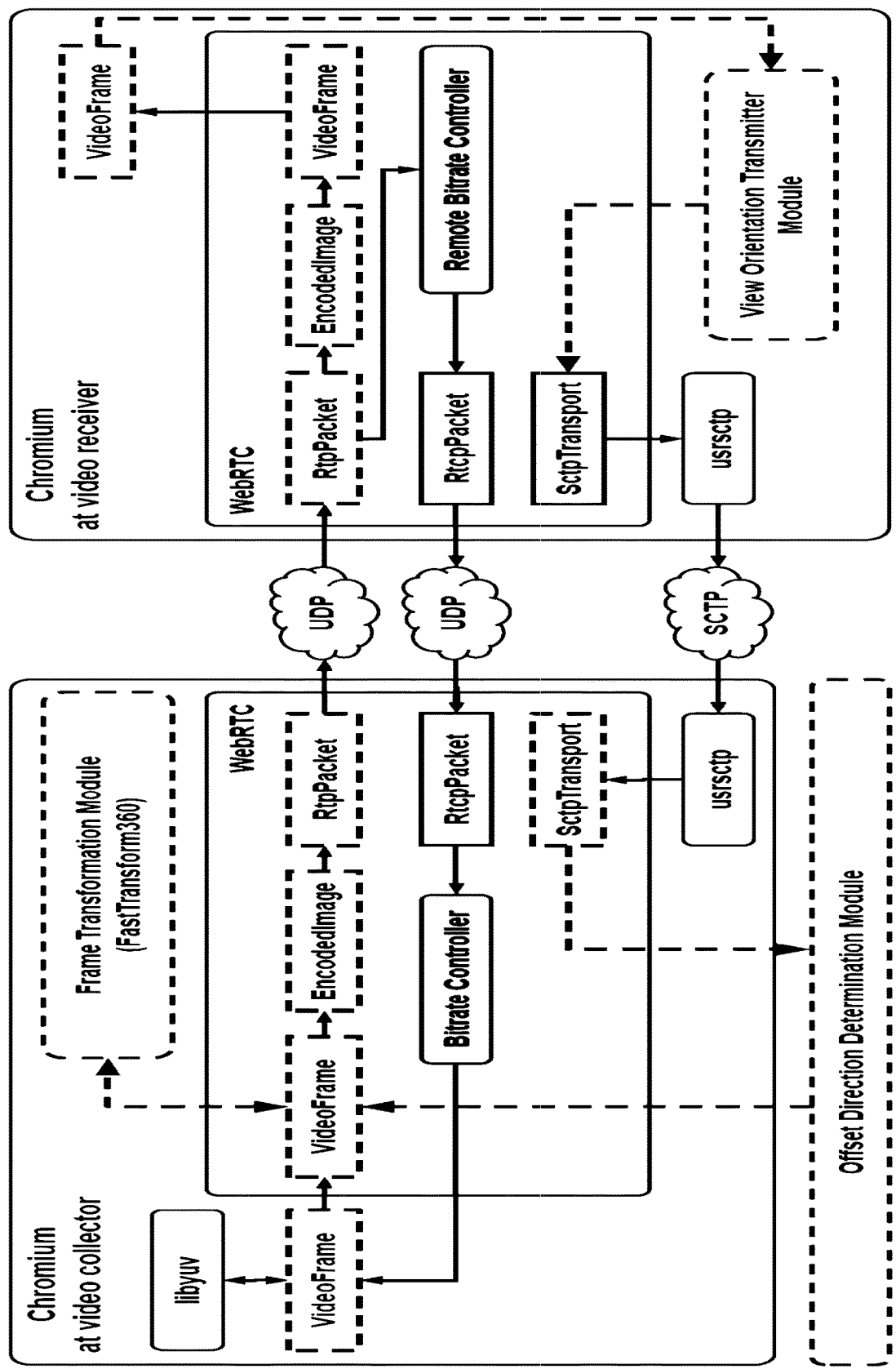
FIG. 4 shows an overview of SphericRTC implementation. Modules in dashed boxes are added or modified by SphericRTC. The libyuv library is used in vanilla WebRTC for frame scaling. With SphericRTC, frame scaling and transformation are all performed via FastTransform360 instead.

FIG. 4 shows an overview of modules added or modified in the SphericRTC implementation. Three new modules are added:

a. the "View Orientation Transmitter" module at the video receiver side provides viewport data feedback to the video collector,
b. the "Offset Direction Determination" module chooses the best offset direction based on feedback from the video receiver, and
c. the "FastTransform360" library performs fast frame transformation.

In addition, to integrate these three new modules with the WebRTC code base, the source code of a number of objects in WebRTC were also modified. These modified WebRTC objects are drawn in dashed boxes in FIG. 4.

The view orientation transmitter is written in Javascript, the offset direction determination module is written in C, and the FastTransform360 library is written in CUDA code and in C++ as an interface. See, github.com/bingsyslab/SphericRTC.

View Orientation Transmission and Offset Direction Determination

To select the best offset direction for content adaptation, the video collector needs to know where the viewer at the video receiver side is going to look at. To do so, the video receiver sends back user's view orientation data to the video collector and let the offset direction determination module perform the prediction.

To reliably transmit user's view orientation data to the video collector, the WebRTC data channel (4) is used, which is implemented using the usrsctp library and transmitted over SCTP. At the video collector, the offset direction determination module is implemented as a shared-memory server using the POSIX shared memory APIs (7). It receives data sent from the video receiver, performs view prediction, and writes the latest prediction to the shared memory space. Future views are simply predicted as the last-received view orientation. However, a more complex view prediction scheme can be easily incorporated into the shared-memory server. When SphericRTC needs the offset direction, it fetches from the piece of memory. With the producer-consumer modeled shared-memory server, the video collector can always get the latest predicted offset direction.

The FastTransform360 Library (FT360)

Facebook has open-sourced a 360-degree video frame processing library, Transform360 (9), that uses the CPU for its transformation operations. However, CPU-based frame transformation cannot easily satisfy the real-time latency and throughput requirements.

To this end, a FastTransform360 (FT360) library is implemented to perform fast frame processing based on joint content and bitrate adaptation decisions. FT360 is compiled as a shared library using CUDA (10) with a C++ interface. It takes frame inputs in YUVI420 byte array format, computes a mapping table, performs sampling using the CUDA sampling module, tex2D ( ), and outputs the transformed frame in YUVI420 format. The FT360 library can perform scaling, rotation, offset, and/or re-projection from input equirectangular-projected frames to desired frames in various base spherical projections.

RTP Header Extension

To provide in-band transmission of offset direction information to the video receiver, an RTP header extension is used to include the information and send it to the video receiver with the frame simultaneously. To transmit frames over the network, encoded frames are split into multiple RTP packets and transmitted via UDP. To reconstruct the frame at the video receiver side, each RTP packet includes a header that includes a timestamp as the frame ID. Furthermore, RTP also allows a header extension mechanism that can carry additional information in the RTP header. 5 bytes of add-on extension are added.

Figure 5:
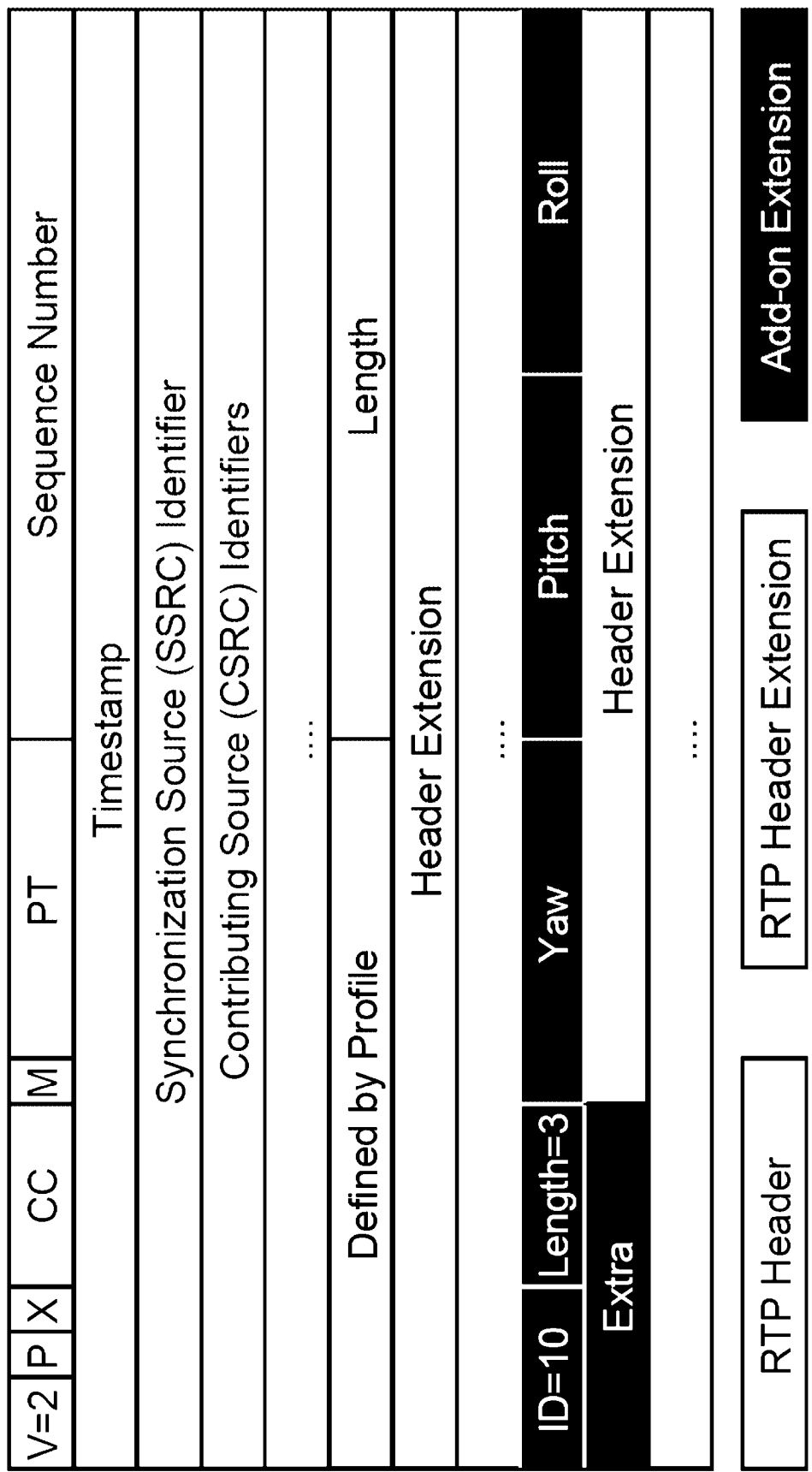
FIG. 5 shows a packet header having 5 additional bytes to support in-band transmission of offset directions.

FIG. 5 shows the new RTP header generated by SphericRTC. The add-on extension is used for encoding the offset direction information into four bytes (uint8): yaw, pitch, roll, and extra. Both "pitch" and "roll" have 180 unique integer values and can be represented using one uint8, while "yaw" has 360 unique integer values, and an extra uint8 is used for it. Overall, the total number of offset directions allowed in the SphericRTC is 360×180×180=11,664,000.

Evaluation

Experiments were conducted comparing SphericRTC with the naive implementation of real-time 360-degree video communication via vanilla WebRTC. The key performance consideration is whether SphericRTC can satisfy the real-time communication requirements, and if the content adaptation provided by SphericRTC can indeed improve the visual quality of views rendered to the end users.

Evaluation Methodology

Dataset

To conduct repeatable experiments for fair comparison between SphericRTC and vanilla WebRTC, 360-degree videos and user head movement traces from two publicly-available datasets (19, 42) were used. For each dataset, 5 videos were used for experiments, and for each video, 50 seconds of video content and 20 users' head movement traces are used, creating in total 10,000 seconds of videos for each test setting. These videos are pre-decoded and saved in .y4m (15) format-a byte array format. The .y4m file can be read as a virtual camera by the Chromium browser, simulating the frame capture of a physical camera (14).

Workflow

The workflows for SphericRTC and vanilla WebRTC are similar. A peer-to-peer WebRTC connection is first established between the video collector and the video receiver (12). Once the WebRTC connection is established, the captured frames will be transformed and encoded at the collector side. Here, all the captured frames are recorded in YUVI420 format before encoding, which is the last place we can keep frames lossless.

Encoded frames are then encrypted, split into RTP packets, and sent to the receiver. At the receiver side, the RTP packets are reassembled, decrypted, and passed to the video decoder. During transmission, some of the frames may not be received due to packet loss or may be dropped due to network delay (e.g., the frame arrives too late). All the frames are also recorded in YUVI420 format after decoding, for performance evaluation. Afterwards, frames are rendered by WebGL shaders implemented in OpenGL Shading Language (GLSL).

For SphericRTC, additional steps are needed. The offset direction determination module at the video collector passes the latest received view-orientation as the predicted offset direction. In the meantime, it also calculates the offset magnitude based on selected target resolution via joint content and bitrate adaptation. The FastTransform360 library then transforms frames to desired offset direction, offset magnitude, and target resolution, and passes them to the encoder. The video receiver extracts the offset direction from the RTP packets and infers the offset magnitude from the resolution of received frames.

Signaling Server

To help establishing the peer-to-peer connection between the video collector and the video receiver, a third-party signaling server (12) is used. In the experiments, this signaling server is also used to store user head movement traces. In this way, the video receiver can fetch the trace file from the third-party server and send the user's trace data to the collector in a desired interval. While the interval of 500 ms is selected for use in the experiments, this interval can be adjusted depending on the network latency, frame content, and user behavior.

Frame Matching and Rendering

Frames recorded at the video collector side are used to generate the "ground truth views", and frames recorded at the video receiver side are used to generate the "receiver-side rendered views". To compare "receiver-side rendered views" with "ground truth views", frames recorded at both sides must first be matched. To do so, timestamps inside the Chromium browser and SphericRTC/WebRTC were utilized. From when a frame is captured to when it is packetized in RTP packets, there exist four levels of timestamps identifying a frame. The RTP timestamp is the only timestamp shared by both sides. To address this issue, all the timestamps are stored at the video collector side as three translation tables. At the video receiver side, while each decoded frame is only associated with its RTP timestamp, by using the translation tables, matches between receiver-side decoded frames with corresponding captured frames can be found.

Views from each pair of matching frames were rendered, and the visual quality metrics between receiver-observed views and ground truth views were calculated. To render views based on user's view orientation, an open-source tool, FFmpeg360 (32) was used, for OpenGL-based view rendering. New shaders were implemented for rendering frames in the offset equirectangular projection. Visual quality results in two objective metrics are reported: viewport peak signal-to-noise ratio (Viewport-PSNR) and viewport structural similarity (14) (Viewport-SSIM).

Experiment Setup

To evaluate SphericRTC's performance under different network scenarios, tc (1) was used for adjusting the network bandwidth, latency, and packet loss rate in different settings. Specifically, for performance under different network bandwidth, 3 test settings: (500 Kbps, 1 Mbps, and no constraint) were employed. Note that vanilla WebRTC consumes approximately 2.5 Mbps bandwidth when there is no bandwidth constraint. For latency evaluations, 3 settings: (additional 500 ms one-way network delay, additional 200 ms one-way, and no additional delay) were employed. Note that with the experiment setup, if no additional delay is added, the end-to-end delay between the video collector and the receiver, is approximately 200 ms one-way. This 200 ms one-way delay includes frame processing time, frame encoding time, network transmission delay, frame decoding time, and frame recording times which are required by the evaluation methodology. Finally, 3 packet loss rate settings: (fixed 5% loss, fixed 2% loss, and nature packet loss) are considered.

Frame Processing Time

FastTransform360 was evaluated to determine if it can perform frame transformation with low latency and high throughput. The per-frame processing time of FastTransform360 was compared with the open-source tool Transform360 on a same machine with an Intel i7-7700K CPU without overclocking and an NVIDIA GeForce GTX 1080 GPU. In the experiments, both FastTransform360 (integrated with SphericRTC) and Transform360 were used for converting input 3840×1920 equirectangular-projected frames to output frames in a fixed resolution of 2880×1440 in the offset equirectangular projection.

Figure 6:
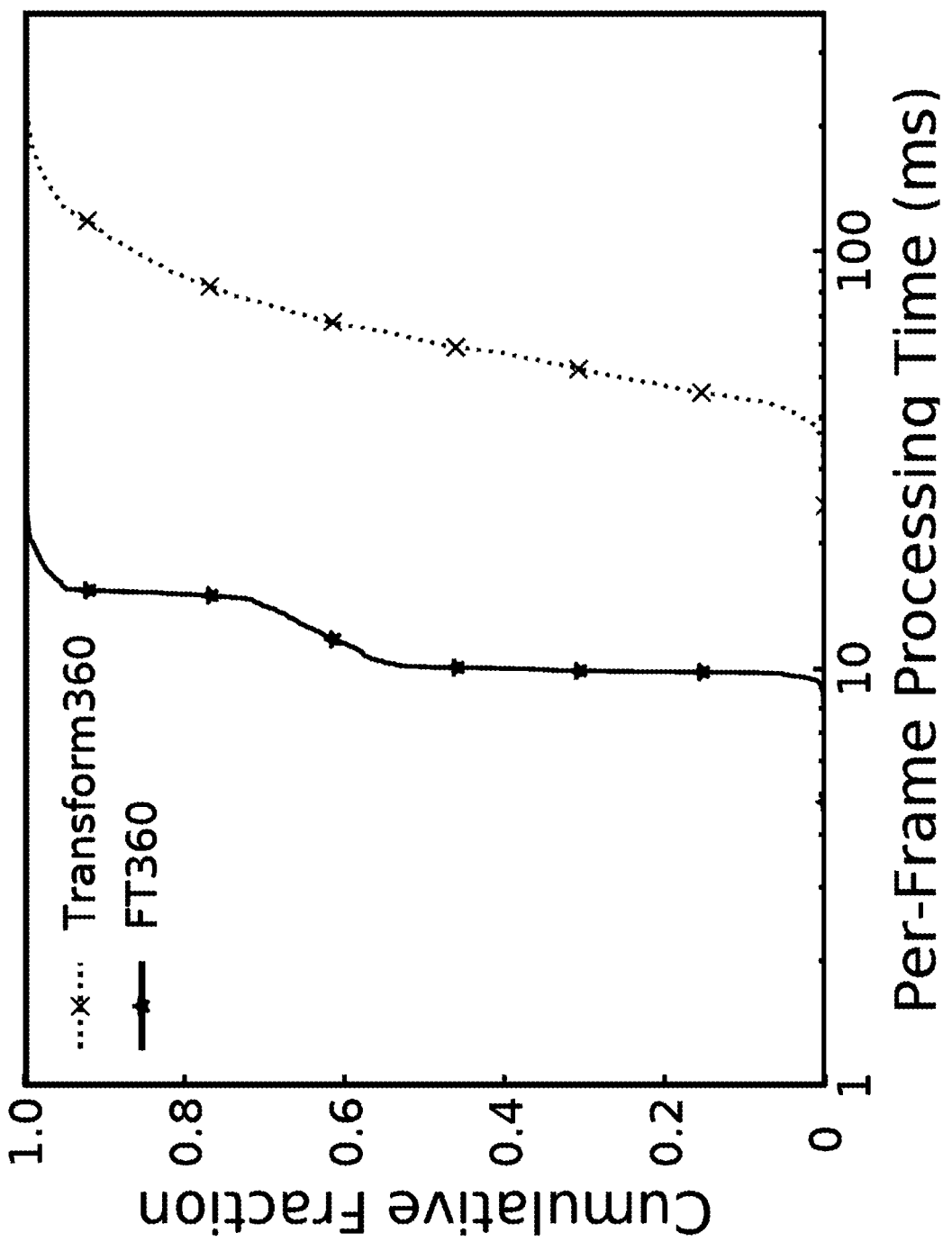
FIG. 6 shows that the FastTransform360 runs significantly faster than Transform360. Note that the x-axis is drawn in log scale.

FIG. 6 shows the per-frame processing time logged in the experiments. Results show that the median frame processing time of CUDA-based FastTransform360 library is 10.099 ms, reaching 99 frames per second (FPS) processing throughput. On the other hand, the median processing time of CPU-based Transform360 is 60.951 ms.

Viewport Quality

For view quality comparison, frames recorded at both the video collector and the video receiver sides and users' head movement traces were recorded to render viewports with 100°×100° FoV. Here, views rendered from frames recorded at the video collector as "ground truth views" were considered, since these frames are not encoded or transformed and are recorded in the lossless manner. "Receiver-side rendered views" are compared with "ground truth views" and report the distribution of Viewport-PSNR and Viewport-SSIM.

Figure 7A:
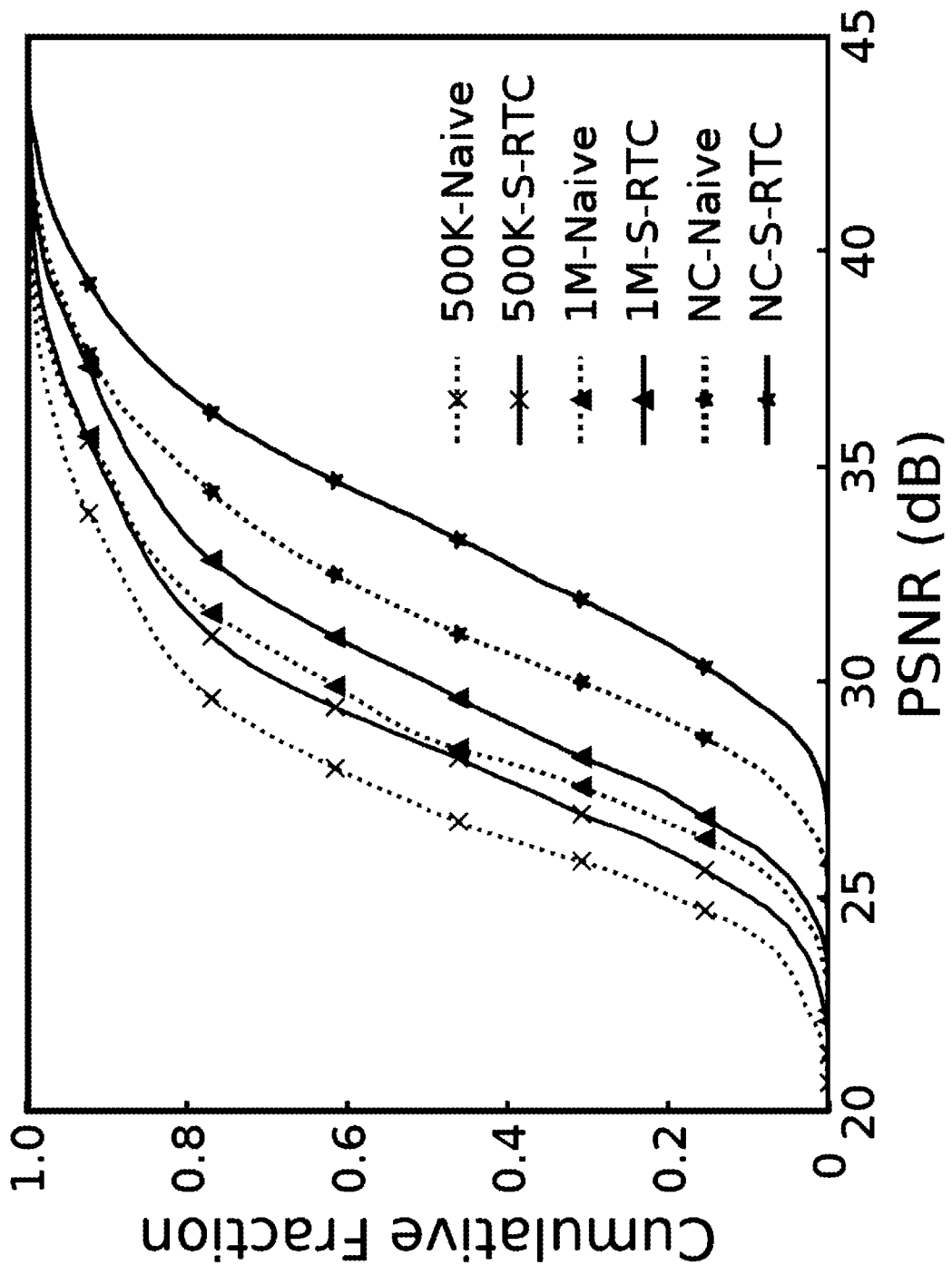
FIGS. 7A and 7B show a viewport quality comparison under different network bandwidth settings (500 Kbps, 1 Mbps, no constraint).
Figure 7B:
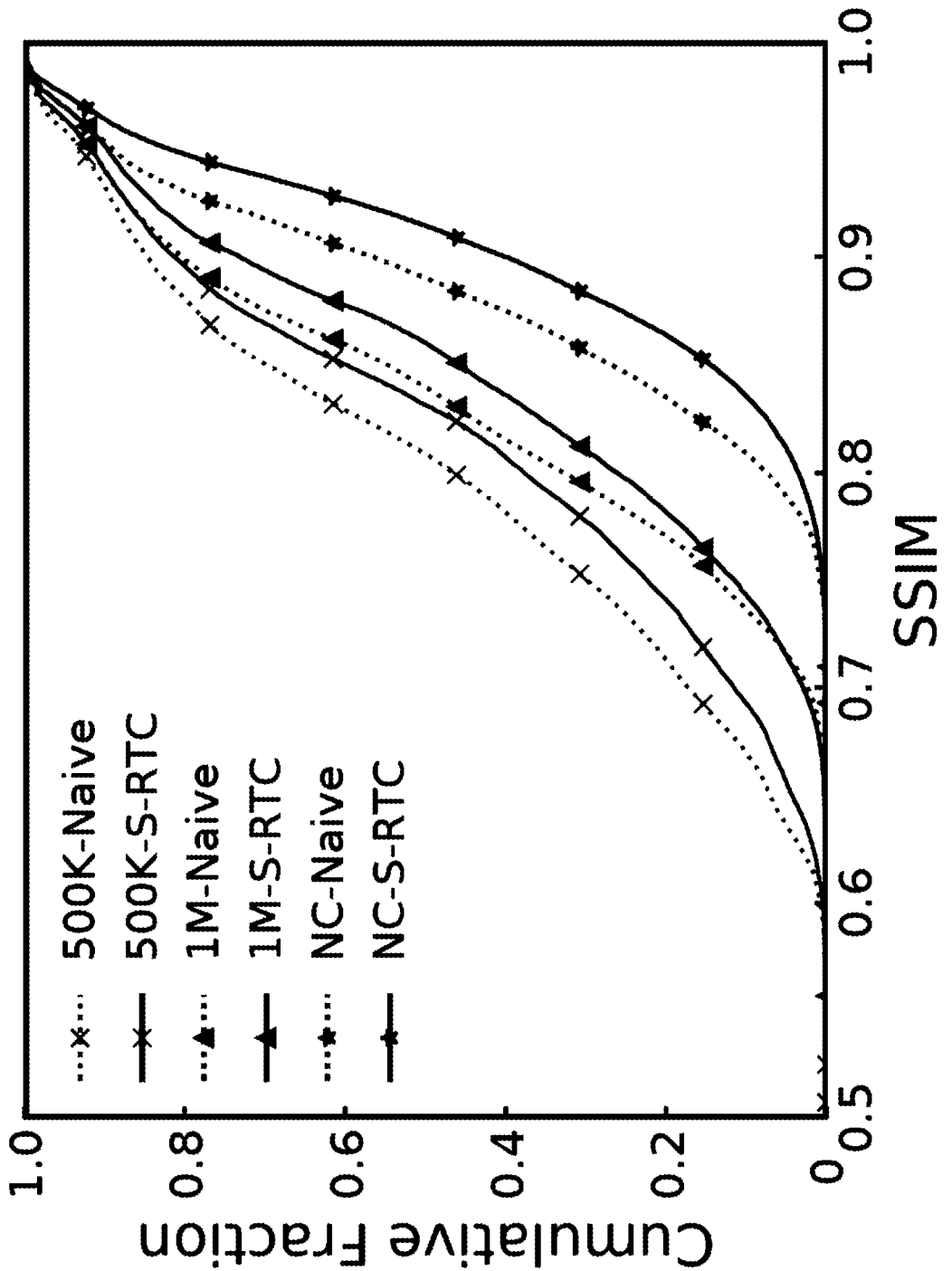

FIGS. 7A and 7B show the viewport quality comparison of various bandwidth settings. In these figures, SphericRTC results are denoted as "S-RTC". Results show that SphericRTC consistently outperforms naive WebRTC-based implementation (i.e., vanilla WebRTC). When there is no network constraint, the median Viewport-PSNR obtained by SphericRTC is 33.66 dB, 2.25 dB higher than the naive solution. The median Viewport-SSIM obtained by SphericRTC is 0.915, while the median Viewport-SSIM obtained by vanilla WebRTC is only 0.890. With 500 Kbps and 1 Mbps bandwidth constraints, SphericRTC still renders views of higher quality, achieving 1.46 dB and 1.31 dB improvement in median Viewport-PSNR, respectively.

Figure 8A:
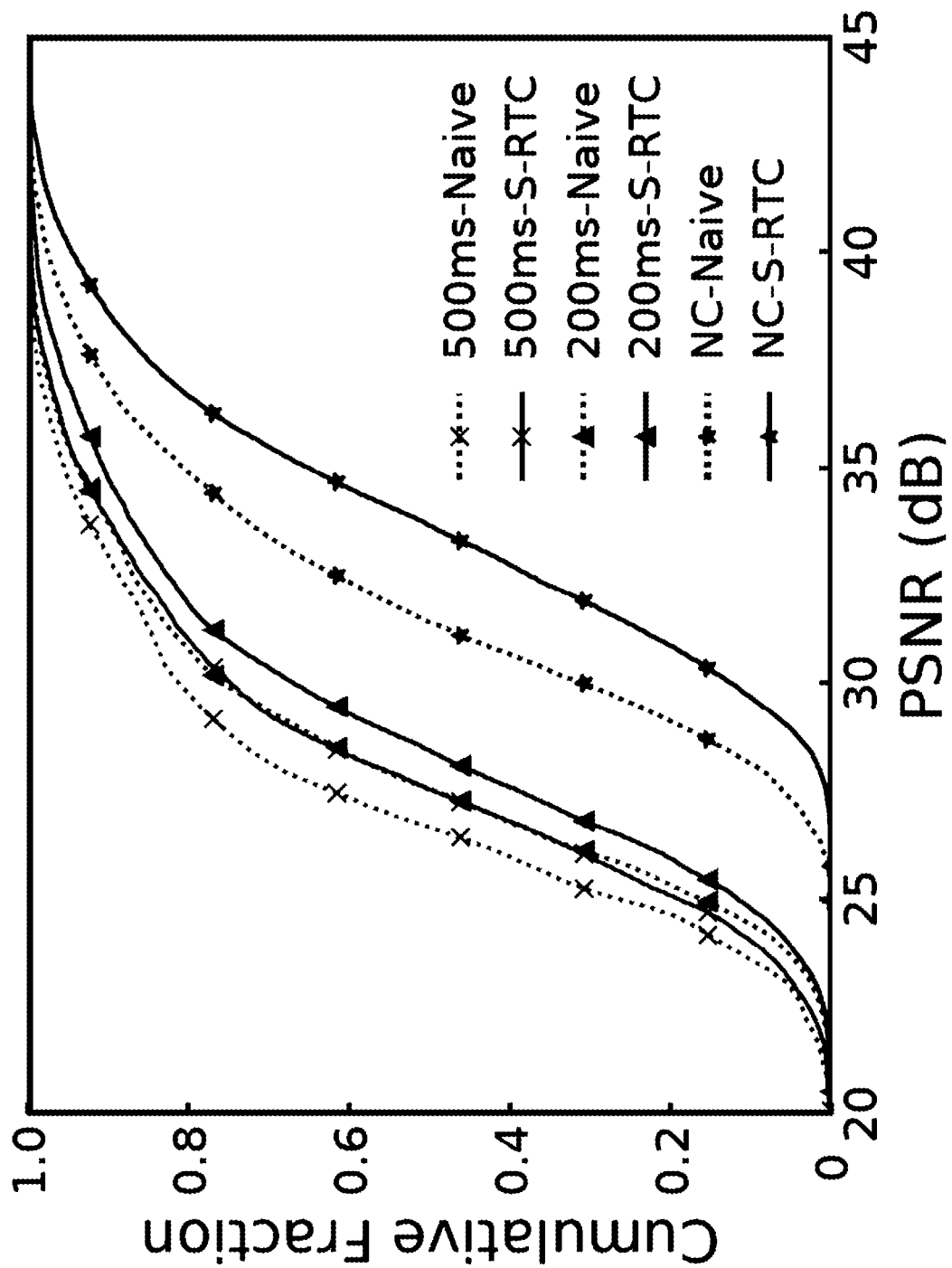
FIGS. 8A and 8B show a viewport quality comparison under different additional network delay settings (500 ms, 200 ms, no additional delay).
Figure 8B:
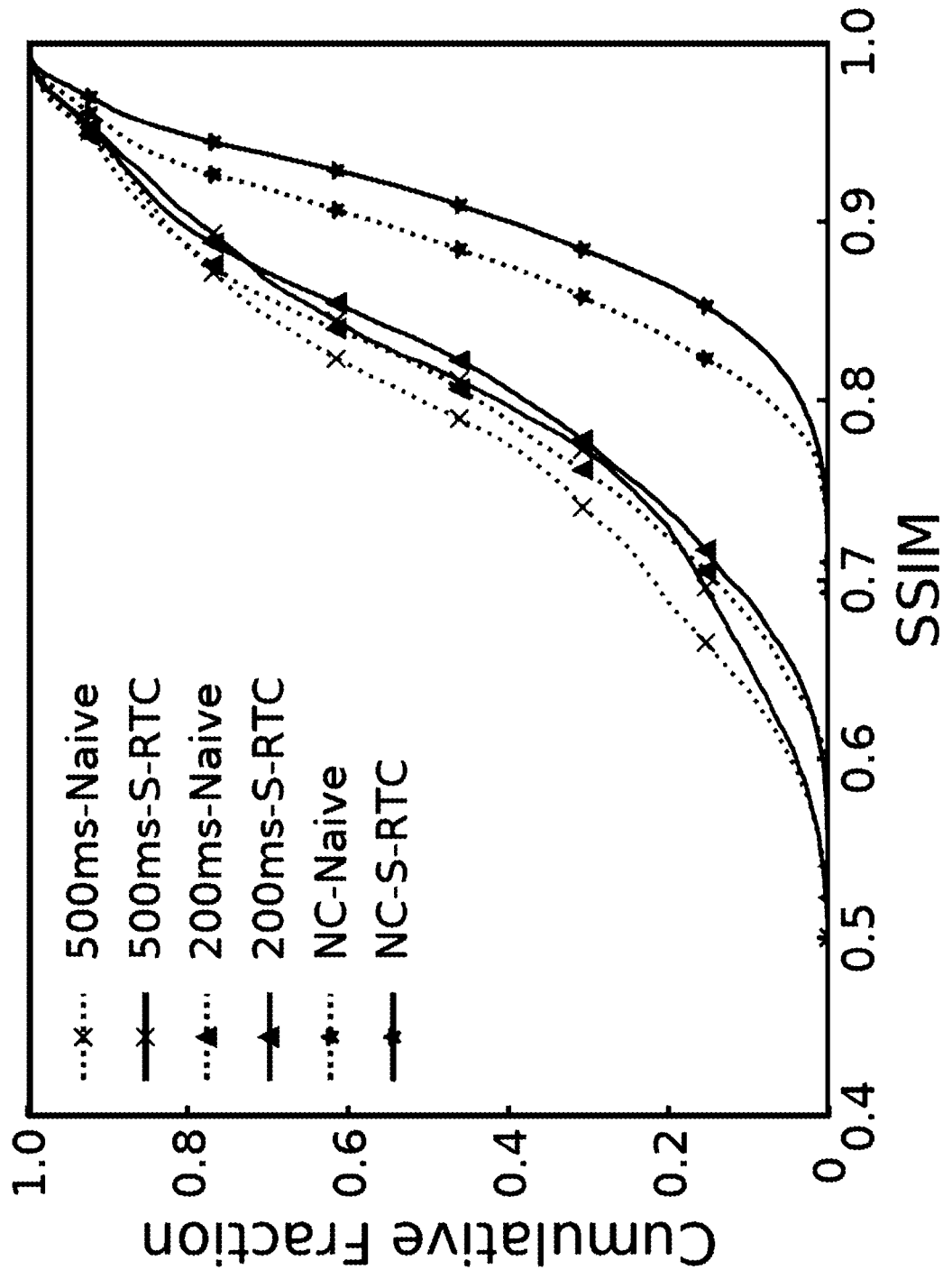

When there is no bandwidth constraint but additional network delay, the results show that the viewport quality decreases. This is because WebRTC's bandwidth controller reduces the target sending bitrate in response to long network delay. Increased network latency also means it takes longer for receiver-side viewport feedback to arrive. As a result, the actual view orientation may be more deviated from the offset orientation used for representing the frame. Using a more complex view prediction scheme can likely alleviate this problem. Even reduced target sending bitrate and less accurate view prediction, results show that SphericRTC still consistently performs better than the naive WebRTC implementation. Detailed results are show in FIGS. 8A and 8B.

Figure 9A:
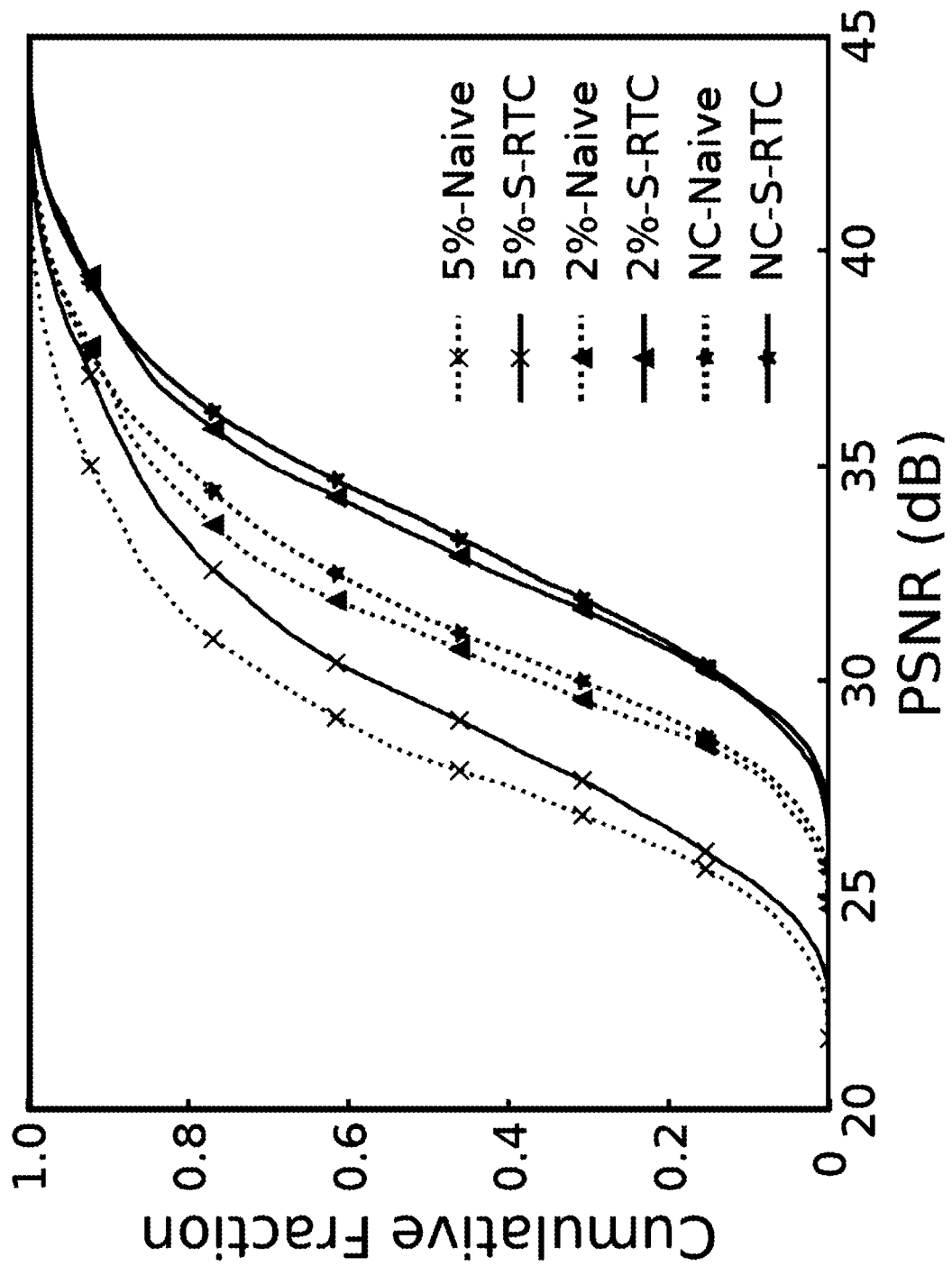
FIGS. 9A and 9B show a viewport quality comparison under different packet loss rate settings (5%, 2%, natural).
Figure 9B:
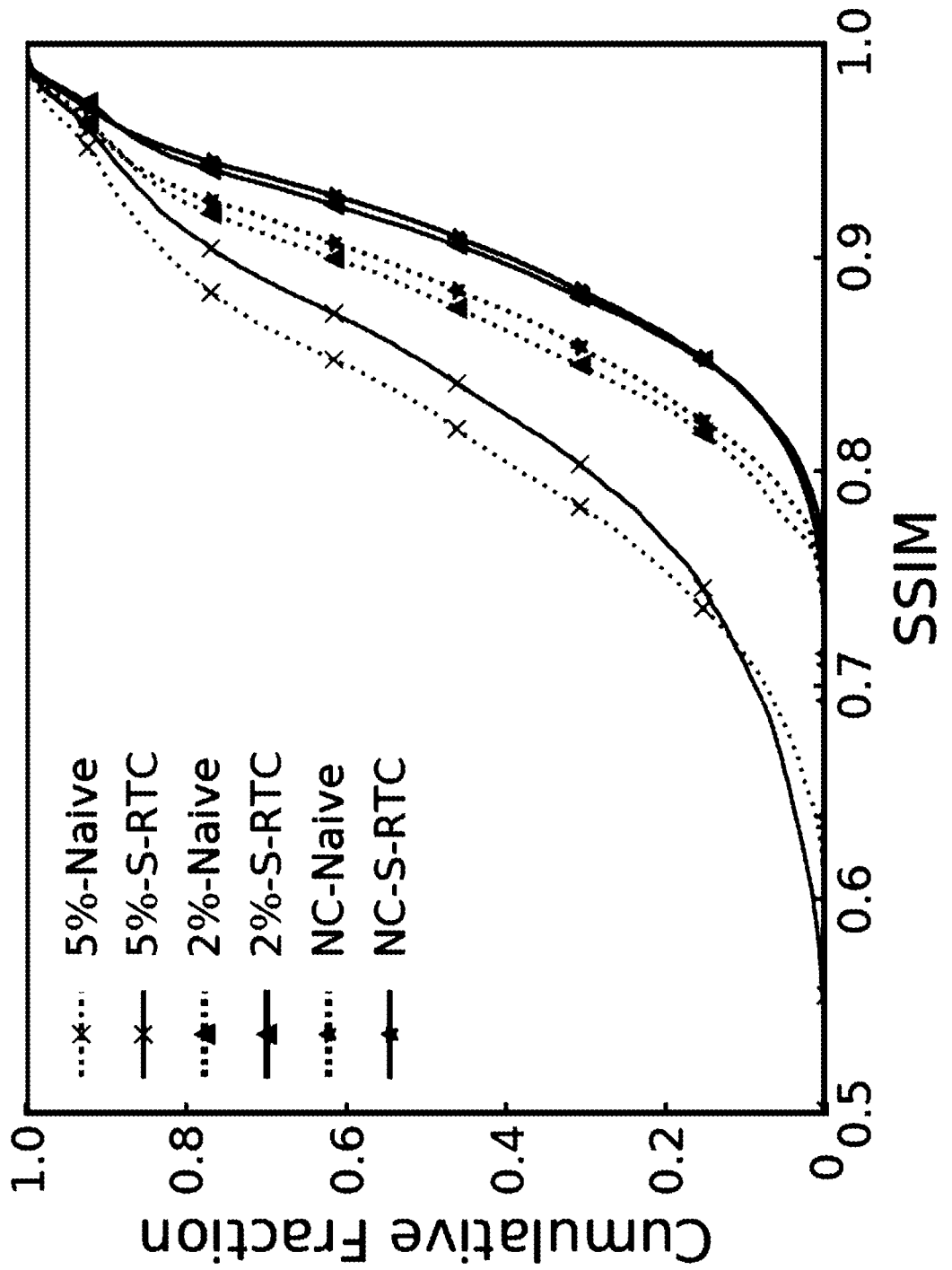

Finally, when there is no bandwidth constraint or additional network delay but with increased (2%) packet loss rate, the median Viewport-PSNR of SphericRTC drops only 0.4 dB. The same can be observed for vanilla WebRTC as well. This indicates that SphericRTC/WebRTC is not very sensitive to a moderate level of packet loss. However, when the packet loss rate increases to 5%, both SphericRTC and WebRTC perform much worse. In all scenarios, SphericRTC consistently outperforms the naive WebRTC implementation as indicated in FIGS. 9A and 9B.

CONCLUSION 360-degree video allows a more-immersive experience compared to the traditional video format. However, delivering 360-degree video requires significant network bandwidth. In the real-time setting, any approach to mitigate this high-bandwidth requirement must be applied within the real-time latency constraints.

SphericRTC applies an efficient, content-adaptive approach to 360-degree video communication within real-time limitations. The system demonstrates that multiple components, view orientation feedback, offset direction/magnitude selection, and fast frame transformation can be effectively integrated within a single practical system. The SphericRTC approach is validated by its performance: the median Viewport-PSNR in SphericRTC is 2.25 dB higher than that of the baseline system.

As used herein, a "processor" may be any type of processor, and may be embodied as one or more processors configured, designed, programmed or otherwise adapted to perform the functionality discussed herein. As the term processor is used herein, a processor may include use of a single integrated circuit ("IC"), or may include use of a plurality of integrated circuits or other components connected, arranged or grouped together, such as controllers, microprocessors, digital signal processors ("DSPs"), array processors, graphics or image processors, parallel processors, multiple core processors, custom ICs, application specific integrated circuits ("ASICs"), field programmable gate arrays ("FPGAs"), adaptive computing ICs, associated memory (such as RAM, DRAM and ROM), and other ICs and components, whether analog or digital. As a consequence, as used herein, the term processor or controller should be understood to equivalently mean and include a single IC, or arrangement of custom ICs, ASICs, processors, microprocessors, controllers, FPGAs, adaptive computing ICs, or some other grouping of integrated circuits which perform the functions discussed herein, with associated memory, such as microprocessor memory or additional RAM, DRAM, SDRAM, SRAM, MRAM, ROM, FLASH, EPROM or E$^2$PROM. A processor, with associated memory, may be adapted or configured (via programming, FPGA interconnection, or hard-wiring) to perform the methodology of the invention, as discussed herein. For example, the methodology may be programmed and stored, in a processor with its associated memory (and/or memory) and other equivalent components, as a set of program instructions or other code (or equivalent configuration or other program) for subsequent execution when the processor is operative (i.e., powered on and functioning). Equivalently, when the processor may be implemented in whole or part as FPGAs, custom ICs and/or ASICs, the FPGAs, custom ICs or ASICs also may be designed, configured and/or hard-wired to implement the methodology of the invention. For example, the processor may be implemented as an arrangement of analog and/or digital circuits, controllers, microprocessors, DSPs and/or ASICs, collectively referred to as a "processor" or "controller", which are respectively hard-wired, programmed, designed, adapted or configured to implement the methodology of the invention, including possibly in conjunction with a memory.

The memory, which may include a data repository (or database), may be embodied in any number of forms, including within any computer or other machine-readable data storage medium, memory device or other storage or communication device for storage or communication of information, currently known or which becomes available in the future, including, but not limited to, a memory integrated circuit ("IC"), or memory portion of an integrated circuit (such as the resident memory within a processor or processor IC), whether volatile or non-volatile, whether removable or non-removable, including without limitation RAM, FLASH, DRAM, SDRAM, SRAM, MRAM, FeRAM, ROM, EPROM or E$^2$PROM, or any other form of memory device, such as a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, or any other type of memory, storage medium, or data storage apparatus or circuit, which is known or which becomes known, depending upon the selected embodiment. The memory may be adapted to store various look up tables, parameters, coefficients, other information and data, programs or instructions (of the software of the present invention), and other types of tables such as database tables.

As indicated above, the processor is hard-wired or programmed, using software and data structures of the invention, for example, to perform the methodology of the present invention. As a consequence, the system and related methods of the present invention, including the various instructions, may be embodied as software which provides such programming or other instructions, such as a set of instructions and/or metadata embodied within a non-transitory computer readable medium, discussed above. Such software may be in the form of source or object code, by way of example and without limitation. Source code further may be compiled into some form of instructions or object code (including assembly language instructions or configuration information). The software, source code or metadata of the present invention may be embodied as any type of code, such as C, C++, CUDA, Matlab, SystemC, LISA, XML, Java, Brew, or any other type of programming language which performs the functionality discussed herein. As a consequence, a "construct", "program construct", "software construct" or "software", as used equivalently herein, means and refers to any programming language, of any kind, with any syntax or signatures, which provides or can be interpreted to provide the associated functionality or methodology specified (when instantiated or loaded into a processor or computer and executed, including the processor, for example).

The software, or other source code of the present invention and any resulting bit file (object code, database, or look up table) may be embodied within any tangible, non-transitory storage medium, such as any of the computer or other machine-readable data storage media, as computer-readable instructions, data structures, program modules or other data, such as discussed above with respect to the memory, e.g., flash memory, optical media, magnetic media, or any other type of data storage apparatus or medium.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

The above description of illustrated embodiments of the invention, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

REFERENCES

Each reference cited herein is expressly incorporated herein by reference in its entirety.

2001. tc(8)—Linux manual page. man7.org/linux/man-pages/man8/tc.8. html.

2004. The Secure Real-time Transport Protocol (SRTP). tools.ietf.org/html/rfc3711.

2015. Transport-wide Congestion Control. tools.ietf.org/html/draft-holmer-rmcat-transport-wide-cc-extensions-01.

2015. WebRTC Data Channels. tools.ietf.org/html/draft-ietf-rtcweb-data-channel-13.

2016. Google Congestion Control Algorithm. tools.ietf.org/html/draft-ietf-rmcat-gcc-02.

2016. Next-generation video encoding techniques for 360 video and VR. code.facebook.com/posts/1126354007399553/next-generation-video-en coding-techniques-for-360-video-and-vr/.

2016. Overview of POSIX shared memory. man7.org/linux/man-pages/man7/shm_overview.7.html.

2017. End-to-end optimizations for dynamic streaming. code.facebook.co m/posts/637561796428084/end-to-end-optimizations-for-dynamic-streaming/.

2019. Transform360. github.com/facebook/transform360.

2020. CUDA. developer.nvidia.com/cuda-zone.

2020. Equirectangular Projection. mathworld.wolfram.com/EquirectangularProjection.html.

2020. Signaling and video calling. developer.mozilla.org/en-US/docs/Web/API/WebRTC_API/Signaling_and_video_calling.

2020. WebRTC. webrtc.org/.

2020. WebRTC Testing. webrtc.github.io/webrtc-org/testing/.

2020. YUV4MPEG2. wiki.multimedia.cx/index.php/YUV4MPEG2.

Trevor Ballard, Carsten Griwodz, Ralf Steinmetz, and Amr Rizk. 2019. RATS: adaptive 360-degree live streaming. In Proceedings of the 10th ACM Multimedia Systems Conference. 308-311.

Gaetano Carlucci, Luca De Cicco, Stefan Holmer, and Saverio Mascolo. 2016. Analysis and design of the google congestion control for web real-time communication (WebRTC). In Proceedings of the 7th International Conference on Multimedia Systems. ACM, 13.

Bo Chen, Zhisheng Yan, Haiming Jin, and Klara Nahrstedt. 2019. Event-driven stitching for tile-based live 360 video streaming. In Proceedings of the 10th ACM Multimedia Systems Conference. 1-12.

Xavier Corbillon, Francesca De Simone, and Gwendal Simon. 2017. 360-degree video head movement dataset. In Proceedings of the 8th ACM on Multimedia Systems Conference. 199-204.

Xavier Corbillon, Francesca De Simone, Gwendal Simon, and Pascal Frossard. 2018. Dynamic adaptive streaming for multi-viewpoint omnidirectional videos. In Proceedings of the 9th ACM Multimedia Systems Conference. 237-249.

Xavier Corbillon, Gwendal Simon, Alisa Devlic, and Jacob Chakareski. 2017. Viewport-adaptive navigable 360-degree video delivery. In Communications (ICC), 2017 IEEE International Conference on. IEEE, 1-7.

Mario Graf, Christian Timmerer, and Christopher Mueller. 2017. Towards bandwidth efficient adaptive streaming of omnidirectional video over http: Design, implementation, and evaluation. In Proceedings of the 8th ACM on Multimedia Systems Conference. ACM, 261-271.

Yu Guan, Chengyuan Zheng, Xinggong Zhang, Zongming Guo, and Junchen Jiang. 2019. Pano: Optimizing 360 video streaming with a better understanding of quality perception. In Proceedings of the ACM Special Interest Group on Data Communication. 394-407.

Simon Gunkel, Martin Prins, Hans Stokking, and Omar Niamut. 2017. WebVR meets WebRTC: Towards 360-degree social VR experiences. IEEE.

Simon N B Gunkel, Marleen D W Dohmen, Hans Stokkinq, and Omar Niamut. 2019. 360-Degree Photo-realistic VR Conferencing. In 2019 IEEE Conference on Virtual Reality and 3D User Interfaces (VR). IEEE, 946-947.

Simon N B Gunkel, Martin Prins, Hans Stokking, and Omar Niamut. 2017. Social VR platform: Building 360-degree shared VR spaces. In Adjunct Publication of the 2017 ACM International Conference on Interactive Experiences for TV and Online Video. 83-84.

Van Kha Ly Ha, Rifai Chai, Hung T Nguyen, et al. 2020. A Telepresence Wheelchair with 360-Degree Vision Using WebRTC. Applied Sciences 10, 1 (2020), 369.

Jian He, Mubashir Adnan Qureshi, Lili Qiu, Jin Li, Feng Li, and Lei Han. 2018. Rubiks: Practical 360-Degree Streaming for Smartphones. In Proceedings of the 16th Annual International Conference on Mobile Systems, Applications, and Services. ACM, 482-494.

Yasamin Heshmat, Brennan Jones, Xiaoxuan Xiong, Carman Neustaedter, Anthony Tang, Bernhard E Riecke, and Lillian Yang. 2018. Geocaching with a beam: Shared outdoor activities through a telepresence robot with 360 degree viewing. In Proceedings of the 2018 CHI Conference on Human Factors in Computing Systems. 1-13.

Wei-Tse Lee, Hsin-I Chen, Ming-Shiuan Chen, I-Chao Shen, and Bing-Yu Chen. 2017. High-resolution 360 Video Foveated Stitching for Real-time VR. In Computer Graphics Forum, Vol. 36. Wiley Online Library, 115-123.

Xing Liu, Bo Han, Feng Qian, and Matteo Varvello. 2019. LIME: understanding commercial 3600 live video streaming services. In Proceedings of the 10th ACM Multimedia Systems Conference. ACM, 154-164.

Yao Liu, Chao Zhou, Shuoqian Wang, and Mengbai Xiao. 2019. FFmpeg360 for 360-degree videos: edge-based transcoding, view rendering, and visual quality comparison: poster. In Proceedings of the 4th ACM/IEEE Symposium on Edge Computing. 337-339.

Anahita Mahzari, Afshin Taghavi Nasrabadi, Aliehsan Samiei, and Ravi Prakash. 2018. Fov-aware edge caching for adaptive 360 video streaming. In Proceedings of the 26th ACM international conference on Multimedia. 173-181.

Cise Midoglu, Ozgu Alay, and Carsten Griwodz. 2019. Evaluation Framework for Real-Time Adaptive 360-Degree Video Streaming over 5G Networks. In Proceedings of the 2019 on Wireless of the Students, by the Students, and for the Students Workshop. 6-8.

Afshin Taghavi Nasrabadi, Anahita Mahzari, Joseph D Beshay, and Ravi Prakash. 2017. Adaptive 360-degree video streaming using scalable video coding. In Proceedings of the 2017 ACM on Multimedia Conference. ACM, 1689-1697.

Afshin Taghavi Nasrabadi, Aliehsan Samiei, and Ravi Prakash. 2020. Viewport prediction for 3600 videos: a clustering approach. In Proceedings of the 30th ACM Workshop on Network and Operating Systems Support for Digital Audio and Video. 34-39.

Stefano Petrangeli, Viswanathan Swaminathan, Mohammad Hosseini, and Filip De Turck. 2017. An http/2-based adaptive streaming framework for 360 virtual reality videos. In Proceedings of the 2017 ACM on Multimedia Conference. ACM, 306-314.

Feng Qian, Bo Han, Qingyang Xiao, and Vijay Gopalakrishnan. 2018. Flare: Practical viewport-adaptive 360-degree video streaming for mobile devices. In Proceedings of the 24th Annual International Conference on Mobile Computing and Networking. 99-114.

Henning Schulzrinne, Steven Casner, R Frederick, and Van Jacobson. 2003. RFC3550: RTP: A transport protocol for real-time applications.

Shu Shi, Varun Gupta, and Rittwik Jana. 2019. Freedom: Fast recovery enhanced yr delivery over mobile networks. In Proceedings of the 17th Annual International Conference on Mobile Systems, Applications, and Services. 130-141.

Zhou Wang, Alan C Bovik, Hamid R Sheikh, and Eero P Simoncelli. 2004. Image quality assessment: from error visibility to structural similarity. IEEE transactions on image processing 13, 4 (2004), 600-612.

Chenglei Wu, Zhihao Tan, Zhi Wang, and Shiqiang Yang. 2017. A dataset for exploring user behaviors in VR spherical video streaming. In Proceedings of the 8th ACM on Multimedia Systems Conference. 193-198.

Lan Xie, Zhimin Xu, Yixuan Ban, Xinggong Zhang, and Zongming Guo. 2017. 360probdash: Improving qoe of 360 video streaming using tile-based http adaptive streaming. In Proceedings of the 25th ACM international conference on Multimedia. 315-323.

Lan Xie, Xinggong Zhang, and Zongming Guo. 2018. Cls: A cross-user learning based system for improving qoe in 360-degree video adaptive streaming. In Proceedings of the 26th ACM international conference on Multimedia. 564-572.

Tan Xu, Bo Han, and Feng Qian. 2019. Analyzing viewport prediction under different VR interactions. In Proceedings of the 15th International Conference on Emerging Networking Experiments And Technologies. 165-171.

Yang Xu, Chenguang Yu, Jingjiang Li, and Yong Liu. 2012. Video telephony for end-consumers: measurement study of Google+, iChat, and Skype. In Proceedings of the 2012 Internet Measurement Conference. ACM, 371-384.

Jun Yi, Shiqing Luo, and Zhisheng Yan. 2019. A measurement study of YouTube 3600 live video streaming. In Proceedings of the 29th ACM Workshop on Network and Operating Systems Support for Digital Audio and Video. ACM, 49-54.

Chenguang Yu, Yang Xu, Bo Liu, and Yong Liu. 2014. "Can you SEE me now?" A measurement study of mobile video calls. In IEEE INFOCOM 2014-IEEE Conference on Computer Communications. IEEE, 1456-1464.

Alireza Zare, Alireza Aminlou, Miska M Hannuksela, and Moncef Gabbouj. 2016. HEVC-compliant tile-based streaming of panoramic video for virtual reality applications. In Proceedings of the 2016 ACM on Multimedia Conference. ACM, 601-605.

Chao Zhou, Zhenhua Li, and Yao Liu. 2017. A measurement study of oculus 360 degree video streaming. In Proceedings of the 8th ACM on Multimedia Systems Conference. 27-37.

Ahmadi, Hamed, Omar Eltobgy, and Mohamed Hefeeda. "Adaptive multicast streaming of virtual reality content to mobile users." In Proceedings of the on Thematic Workshops of ACM Multimedia 2017, pp. 170-178. 2017.

Argyriou, Lemonia. "Design methodology for 360-degree immersive video applications." PhD diss., University of Westminster, 2020.

Ballard, Trevor, Carsten Griwodz, Ralf Steinmetz, and Amr Rizk. "RATS: adaptive 360-degree live streaming." In Proceedings of the 10th ACM Multimedia Systems Conference, pp. 308-311. 2019.

Ban, Yixuan, Lan Xie, Zhimin Xu, Xinggong Zhang, Zongming Guo, and Yueyu Hu. "An optimal spatial-temporal smoothness approach for tile-based 360-degree video streaming." In 2017 IEEE Visual Communications and Image Processing (VCIP), pp. 1-4. IEEE, 2017.

Chai, Rifai, and Hung T. Nguyen. "Real-time WebRTC-based design for a telepresence wheelchair." In 2017 39th Annual International Conference of the IEEE Engineering in Medicine and Biology Society (EMBC), pp. 2676-2679. IEEE, 2017.

Chakareski, Jacob. "Viewport-Adaptive Scalable Multi-User Virtual Reality Mobile-Edge Streaming." IEEE Transactions on Image Processing 29 (2020): 6330-6342.

Chen, Zhenzhong, Yiming Li, and Yingxue Zhang. "Recent advances in omnidirectional video coding for virtual reality: Projection and evaluation." Signal Processing 146 (2018): 66-78.

Corbillon, Xavier, Alisa Devlic, Gwendal Simon, and Jacob Chakareski. "Optimal set of 360-degree videos for viewport-adaptive streaming." In Proceedings of the 25th ACM international conference on Multimedia, pp. 943-951. 2017.

Corbillon, Xavier, Francesca De Simone, Gwendal Simon, and Pascal Frossard. "Dynamic adaptive streaming for multi-viewpoint omnidirectional videos." In Proceedings of the 9th ACM Multimedia Systems Conference, pp. 237-249. 2018.

Corbillon, Xavier, Gwendal Simon, Alisa Devlic, and Jacob Chakareski. "Viewport-adaptive navigable 360-degree video delivery." In 2017 IEEE international conference on communications (ICC), pp. 1-7. IEEE, 2017.

da Costa Filho, Roberto Iraji Tavares, Marcelo Caggiani Luizelli, Maria Torres Vega, Jeroen van der Hooft, Stefano Petrangeli, Tim Wauters, Filip De Turck, and Luciano Paschoal Gaspary. "Predicting the performance of virtual reality video streaming in mobile networks." In Proceedings of the 9th ACM Multimedia Systems Conference, pp. 270-283. 2018.

Duanmu, Fanyi, Eymen Kurdoglu, Yong Liu, and Yao Wang. "View direction and bandwidth adaptive 360 degree video streaming using a two-tier system." In 2017 IEEE International Symposium on Circuits and Systems (ISCAS), pp. 1-4. IEEE, 2017.

El-Ganainy, Tarek, and Mohamed Hefeeda. "Streaming virtual reality content." arXiv preprint arXiv:1612.08350 (2016).

El-Ganainy, Tarek. "Spatiotemporal rate adaptive tiled scheme for 360 sports events." arXiv preprint arXiv:1705.04911 (2017).

Fan, Ching-Ling, Jean Lee, Wen-Chih Lo, Chun-Ying Huang, Kuan-Ta Chen, and Cheng-Hsin Hsu. "Fixation prediction for 360 video streaming in head-mounted virtual reality." In Proceedings of the 27th Workshop on Network and Operating Systems Support for Digital Audio and Video, pp. 67-72. 2017.

Fan, Ching-Ling, Shou-Cheng Yen, Chun-Ying Huang, and Cheng-Hsin Hsu. "On the Optimal Encoding Ladder of Tiled 3600 Videos for Head-Mounted Virtual Reality." IEEE Transactions on Circuits and Systems for Video Technology (2020).

Gaddam, Vamsidhar Reddy, Michael Riegler, Ragnhild Eg, Carsten Griwodz, and Pil Halvorsen. "Tiling in interactive panoramic video: Approaches and evaluation." IEEE Transactions on Multimedia 18, no. 9 (2016): 1819-1831.

Ghaznavi-Youvalari, Ramin, Alireza Zare, Alireza Aminlou, Miska M. Hannuksela, and Moncef Gabbouj. "Shared coded picture technique for tile-based viewport-adaptive streaming of omnidirectional video." IEEE Transactions on Circuits and Systems for Video Technology 29, no. 10 (2018): 3106-3120.

Ghaznavi-Youvalari, Ramin, Alireza Zare, Huameng Fang, Alireza Aminlou, Qingpeng Xie, Miska M. Hannuksela, and Moncef Gabbouj. "Comparison of HEVC coding schemes for tile-based viewport-adaptive streaming of omnidirectional video." In 2017 IEEE 19th International Workshop on Multimedia Signal Processing (MMSP), pp. 1-6. IEEE, 2017.

Graf, Mario, Christian Timmerer, and Christopher Mueller. "Towards bandwidth efficient adaptive streaming of omnidirectional video over http: Design, implementation, and evaluation." In Proceedings of the 8th ACM on Multimedia Systems Conference, pp. 261-271. 2017.

Gunkel, Simon N B, Marleen D W Dohmen, Hans Stokkinq, and Omar Niamut. "360-degree photo-realistic VR conferencing." In 2019 IEEE Conference on Virtual Reality and 3D User Interfaces (VR), pp. 946-947. IEEE, 2019.

Han, Yi, Yafeng Ma, Yangzhe Liao, and Gabriel-Miro Muntean. "QoE Oriented Adaptive Streaming Method for 360° Virtual Reality Videos." In 2019 IEEE SmartWorld, Ubiquitous Intelligence & Computing, Advanced & Trusted Computing, Scalable Computing & Communications, Cloud & Big Data Computing, Internet of People and Smart City Innovation (SmartWorld/SCALCOM/UIC/ATC/CBDCom/IOP/SCI), pp. 1655-1659. IEEE, 2019.

Hao, Zhenhua. "Adaptable P2P panoramic video streaming system based on WebRTC and WebGL." In 2016 International Conference on Audio, Language and Image Processing (ICALIP), pp. 166-169. IEEE, 2016.

Heshmat, Yasamin, Brennan Jones, Xiaoxuan Xiong, Carman Neustaedter, Anthony Tang, Bernhard E. Riecke, and Lillian Yang. "Geocaching with a beam: Shared outdoor activities through a telepresence robot with 360 degree viewing." In Proceedings of the 2018 CHI Conference on Human Factors in Computing Systems, pp. 1-13. 2018.

Heyse, Joris, Maria Torres Vega, Femke De Backere, and Filip De Turck. "Contextual bandit learning-based viewport prediction for 360 video." In 2019 IEEE Conference on Virtual Reality and 3D User Interfaces (VR), pp. 972-973. IEEE, 2019.

Hosseini, Mohammad, and Viswanathan Swaminathan. "Adaptive 360 VR video streaming: Divide and conquer." In 2016 IEEE International Symposium on Multimedia (ISM), pp. 107-110. IEEE, 2016.

Hosseini, Mohammad. "View-aware tile-based adaptations in 360 virtual reality video streaming." In 2017 IEEE Virtual Reality (VR), pp. 423-424. IEEE, 2017.

Ikei, Yasushi, Vibol Yem, Kento Tashiro, Toi Fujie, Tomohiro Amemiya, and Michiteru Kitazaki. "Live Stereoscopic 3D Image with Constant Capture Direction of 3600 Cameras for High-Quality Visual Telepresence." In 2019 IEEE Conference on Virtual Reality and 3D User Interfaces (VR), pp. 431-439. IEEE, 2019.

Khiem, Ngo Quang Minh, Guntur Ravindra, and Wei Tsang Ooi. "Adaptive encoding of zoomable video streams based on user access pattern." Signal Processing: Image Communication 27, no. 4 (2012): 360-377.

Kim, Hyun-Wook, and Sung-Hyun Yang. "Region of interest-based segmented tiled adaptive streaming using head-mounted display tracking sensing data." International Journal of Distributed Sensor Networks 15, no. 12 (2019): 1550147719894533.

Kim, Yong-Hwan, Jingang Huh, and Jinwoo Jeong. "Distributed Video Transcoding System for 8K 360° VR Tiled Streaming Service." In 2018 International Conference on Information and Communication Technology Convergence (ICTC), pp. 592-595. IEEE, 2018.

Leclerc, Yvan G., and Stephen Q. Lau. "TerraVision: A terrain visualization system." SRI International, Technical Note 540 (1994): 20.

Letid, Marko, Kosa Nenadid, and Lazar Nikolid. "Real-time map projection in virtual reality using WebVR." In 2018 41st International Convention on Information and Communication Technology, Electronics and Microelectronics (MIPRO), pp. 1439-1443. IEEE, 2018.

Lo, Wen-Chih, Ching-Ling Fan, Shou-Cheng Yen, and Cheng-Hsin Hsu. "Performance measurements of 3600 video streaming to head-mounted displays over live 4G cellular networks." In 2017 19th Asia-Pacific Network Operations and Management Symposium (APNOMS), pp. 205-210. IEEE, 2017.

Maehara, Yuki, and Toshiro Nunome. "WebRTC-based multi-view video and audio transmission and its QoE." In 2019 International Conference on Information Networking (ICOIN), pp. 181-186. IEEE, 2019.

Mahzari, Anahita, Afshin Taghavi Nasrabadi, Aliehsan Samiei, and Ravi Prakash. "Fov-aware edge caching for adaptive 360 video streaming." In Proceedings of the 26th ACM international conference on Multimedia, pp. 173-181. 2018.

Nasrabadi, Afshin Taghavi, Anahita Mahzari, Joseph D. Beshay, and Ravi Prakash. "Adaptive 360-degree video streaming using scalable video coding." In Proceedings of the 25th ACM international conference on Multimedia, pp. 1689-1697. 2017.

Nguyen, Duc V., Huyen T T Tran, and Truong Cong Thang. "Adaptive tiling selection for viewport adaptive streaming of 360-degree video." IEICE Transactions on Information and Systems 102, no. 1 (2019): 48-51.

Nguyen, Duc V., Huyen T T Tran, Anh T. Pham, and Truong Cong Thang. "An optimal tile-based approach for viewport-adaptive 360-degree video streaming." IEEE Journal on Emerging and Selected Topics in Circuits and Systems 9, no. 1 (2019): 29-42.

Nguyen, Minh, Dang H. Nguyen, Cuong T. Pham, Nam Pham Ngoc, Duc V. Nguyen, and Truong Cong Thang. "An adaptive streaming method of 360 videos over HTTP/2 protocol." In 2017 4th NAFOSTED Conference on Information and Computer Science, pp. 302-307. IEEE, 2017.

Nishanth, C., Abhijeet Agarwal, N. Navyasri, and A. Joshua Jafferson. "Virtual Presence with 360 Camera." (2018).

Ohta, Masaya, Shunsuke Nagano, Koichi Nagata, and Katsumi Yamashita. "Mixed-reality Web shopping system using panoramic view inside real store." In SIGGRAPH Asia 2015 Mobile Graphics and Interactive Applications, pp. 1-3. 2015.

Ozcinar, Cagri, Ana De Abreu, and Aljosa Smolic. "Viewport-aware adaptive 360 video streaming using tiles for virtual reality." In 2017 IEEE International Conference on Image Processing (ICIP), pp. 2174-2178. IEEE, 2017. arXiv preprint arXiv:1711.02386 (2017).

Ozcinar, Cagri, Ana De Abreu, Sebastian Knorr, and Aljosa Smolic. "Estimation of optimal encoding ladders for tiled 360 VR video in adaptive streaming systems." In 2017 IEEE International Symposium on Multimedia (ISM), pp. 45-52. IEEE, 2017.

Ozcinar, Cagri, Julian Cabrera, and Aljosa Smolic. "Visual attention-aware omnidirectional video streaming using optimal tiles for virtual reality." IEEE Journal on Emerging and Selected Topics in Circuits and Systems 9, no. 1 (2019): 217-230.

Petrangeli, Stefano, Gwendal Simon, and Viswanathan Swaminathan. "Trajectory-based viewport prediction for 360-degree virtual reality videos." In 2018 IEEE International Conference on Artificial Intelligence and Virtual Reality (AIVR), pp. 157-160. IEEE, 2018.

Petrangeli, Stefano, Viswanathan Swaminathan, Mohammad Hosseini, and Filip De Turck. "An http/2-based adaptive streaming framework for 360 virtual reality videos." In Proceedings of the 25th ACM international conference on Multimedia, pp. 306-314. 2017.

Petrangeli, Stefano, Viswanathan Swaminathan, Mohammad Hosseini, and Filip De Turck. "Improving virtual reality streaming using http/2." In Proceedings of the 8th ACM on Multimedia Systems Conference, pp. 225-228. 2017.

Prins, Martin J., Simon N B Gunkel, Hans M. Stokking, and Omar A. Niamut. "TogetherVR: A framework for photo-realistic shared media experiences in 360-degree VR." SMPTE Motion Imaging Journal 127, no. 7 (2018): 39-44.

Qian, Feng, Bo Han, Qingyang Xiao, and Vijay Gopalakrishnan. "Flare: Practical viewport-adaptive 360-degree video streaming for mobile devices." In Proceedings of the 24th Annual International Conference on Mobile Computing and Networking, pp. 99-114. 2018.

Reddy, Martin, Yvan Leclerc, Lee Iverson, and Nat Bletter. "TerraVision II: Visualizing massive terrain databases in VRML." IEEE Computer graphics and Applications 19, no. 2 (1999): 30-38. See www.ai.sri.com/-magic/terravision.html.

Renambot, Luc, Arun Rao, Rajvikram Singh, Byungil Jeong, Naveen Krishnaprasad, Venkatram Vishwanath, Vaidya Chandrasekhar et al. "Sage: the scalable adaptive graphics environment." In Proceedings of WACE, vol. 9, no. 23, pp. 2004-09. 2004.

Rossi, Silvia, and Laura Toni. "Navigation-aware adaptive streaming strategies for omnidirectional video." In 2017 IEEE 19th International Workshop on Multimedia Signal Processing (MMSP), pp. 1-6. IEEE, 2017.

Sanchez, Yago, Robert Skupin, Cornelius Hellge, and Thomas Schierl. "Random access point period optimization for viewport adaptive tile based streaming of 3600 video." In 2017 IEEE International Conference on Image Processing (ICIP), pp. 1915-1919. IEEE, 2017.

Shamma, David A., Tony Dunnigan, Yulius Tjahjadi, and John Doherty. "Visualizing Gaze Presence for 360 Cameras." (2019).

Shi, Shu, Varun Gupta, Rittwik Jana, John F. Murray, and Michael Hwang. "Methods, devices, and systems for updating streaming panoramic video content due to a change in user viewpoint." U.S. Published Patent Application 2020/0162766 A1, May 21, 2020.

Singh, Varun, Albert Abello Lozano, and Jorg Ott. "Performance analysis of receive-side real-time congestion control for WebRTC." In 2013 20th International Packet Video Workshop, pp. 1-8. IEEE, 2013.

Singla, Ashutosh, Steve Goring, Alexander Raake, Britta Meixner, Rob Koenen, and Thomas Buchholz. "Subjective quality evaluation of tile-based streaming for omnidirectional videos." In Proceedings of the 10th ACM Multimedia Systems Conference, pp. 232-242. 2019.

Skupin, Robert, Yago Sanchez, Cornelius Hellge, and Thomas Schierl. "Tile based HEVC video for head mounted displays." In 2016 IEEE International Symposium on Multimedia (ISM), pp. 399-400. IEEE, 2016.

Son, Jangwoo, and Eun-Seok Ryu. "Tile-based 360-degree video streaming for mobile virtual reality in cyber physical system." Computers & Electrical Engineering 72 (2018): 361-368.

Speicher, Maximilian, Jingchen Cao, Ao Yu, Haihua Zhang, and Michael Nebeling. "360anywhere: Mobile ad-hoc collaboration in any environment using 360 video and augmented reality." Proceedings of the ACM on Human-Computer Interaction 2, no. EICS (2018): 1-20.

Sreedhar, Kashyap Kammachi, Alireza Aminlou, Miska M. Hannuksela, and Moncef Gabbouj. "Viewport-adaptive encoding and streaming of 360-degree video for virtual reality applications." In 2016 IEEE International Symposium on Multimedia (ISM), pp. 583-586. IEEE, 2016.

Swaminathan, Viswanathan, and Mohammad Hosseini. "Prioritizing tile-based virtual reality video streaming using adaptive rate allocation." U.S. Pat. No. 10,595,069, issued Mar. 17, 2020.

Taghavi Nasrabadi, Afshin, Anahita Mahzari, Joseph D. Beshay, and Ravi Prakash. "Adaptive 360-degree video streaming using layered video coding." In 2017 IEEE Virtual Reality (VR), pp. 347-348. IEEE, 2017.

Takada, Masaya, Dai Nishioka, and Yoshia Saito. "Proposal of a Spherical Heat Map in 360-Degree Internet Live Broadcasting Using Viewers' POV." In 2019 IEEE International Conference on Pervasive Computing and Communications Workshops (PerCom Workshops), pp. 596-600. IEEE, 2019.

Timmerer, Christian, Mario Graf, and Christopher Mueller. "Adaptive streaming of vr/360-degree immersive media services with high qoe." In 2017 NAB Broadcast Engineering and IT Conference (BEITC), Las Vegas, Nev., USA. 2017.

Tjahjadi, Yulius, Donald Kimber, Qiong Liu, and Laurent Denoue. "Systems and methods for automatic detection and insetting of digital streams into a 360-degree video." U.S. Published Patent Application 2020/021750 A1, published Dec. 22, 2020.

Tran, Huyen T T, Duc V. Nguyen, Nam Pham Ngoc, and Truong Cong Thang. "A tile-based solution using cubemap for viewport-adaptive 360-degree video delivery." IEICE Transactions on Communications (2019): 2018ANP0009.

Tu, Zhengzhong, Tongyu Zong, Xueliang Xi, Li Ai, Yize Jin, Xiaoyang Zeng, and Yibo Fan. "Content adaptive tiling method based on user access preference for streaming panoramic video." In 2018 IEEE International Conference on Consumer Electronics (ICCE), pp. 1-4. IEEE, 2018.

Van der Hooft, Jeroen, Maria Torres Vega, Stefano Petrangeli, Tim Wauters, and Filip De Turck. "Tile-based adaptive streaming for virtual reality video." ACM Transactions on Multimedia Computing, Communications, and Applications (TOMM) 15, no. 4 (2019): 1-24.

van der Hooft, Jeroen, Maria Torres Vega, Stefano Petrangeli, Tim Wauters, and Filip De Turck. "Optimizing adaptive tile-based virtual reality video streaming." In 2019 IFIP/IEEE Symposium on Integrated Network and Service Management (IM), pp. 381-387. IEEE, 2019.

van der Hooft, Jeroen, Maria Torres Vega, Stefano Petrangeli, Tim Wauters, and Filip De Turck. "Quality assessment for adaptive virtual reality video streaming: A probabilistic approach on the user's gaze." In 2019 22nd Conference on Innovation in Clouds, Internet and Networks and Workshops (ICIN), pp. 19-24. IEEE, 2019.

Vega, Maria Torres, Jeroen van der Hooft, Joris Heyse, Femke De Backere, Tim Wauters, Filip De Turck, and Stefano Petrangeli. "Exploring New York in 8K: an adaptive tile-based virtual reality video streaming experience." In Proceedings of the 10th ACM Multimedia Systems Conference, pp. 330-333. 2019.

Wijnants, Maarten, Peter Quax, Gustavo Rovelo Ruiz, Wim Lamotte, Johan Claes, and Jean-Frangois Macq. "An optimized adaptive streaming framework for interactive immersive video experiences." In 2015 IEEE International Symposium on Broadband Multimedia Systems and Broadcasting, pp. 1-6. IEEE, 2015.

Xie, Lan, Xinggong Zhang, and Zongming Guo. "Cls: A cross-user learning based system for improving qoe in 360-degree video adaptive streaming." In Proceedings of the 26th ACM international conference on Multimedia, pp. 564-572. 2018.

Xie, Lan, Zhimin Xu, Yixuan Ban, Xinggong Zhang, and Zongming Guo. "360probdash: Improving qoe of 360 video streaming using tile-based http adaptive streaming." In Proceedings of the 25th ACM international conference on Multimedia, pp. 315-323. 2017.

Xie, Xiufeng, and Xinyu Zhang. "Poi360: Panoramic mobile video telephony over lte cellular networks." In Proceedings of the 13th International Conference on emerging Networking Experiments and Technologies, pp. 336-349. 2017.

Xu, Zhimin, Xinggong Zhang, Kai Zhang, and Zongming Guo. "Probabilistic viewport adaptive streaming for 360-degree videos." In 2018 IEEE International Symposium on Circuits and Systems (ISCAS), pp. 1-5. IEEE, 2018.

Yaqoob, Abid, Ting Bi, and Gabriel-Miro Muntean. "A Survey on Adaptive 360° Video Streaming: Solutions, Challenges and Opportunities." IEEE Communications Surveys & Tutorials (2020).

Yen, Shou-Cheng, Cheng-Ling Fan, and Cheng-Hsin Hsu. "Streaming 3600 videos to head-mounted virtual reality using DASH over QUIC transport protocol." In Proceedings of the 24th ACM Workshop on Packet Video, pp. 7-12. 2019.

Zare, Alireza, Alireza Aminlou, and Miska M. Hannuksela. "Virtual reality content streaming: Viewport-dependent projection and tile-based techniques." In 2017 IEEE International Conference on Image Processing (ICIP), pp. 1432-1436. IEEE, 2017.

Zare, Alireza, Kashyap Kammachi Sreedhar, Vinod Kumar Malamal Vadakital, Alireza Aminlou, Miska M. Hannuksela, and Moncef Gabbouj. "HEVC-compliant viewport-adaptive streaming of stereoscopic panoramic video." In 2016 Picture Coding Symposium (PCS), pp. 1-5. IEEE, 2016.

Zhao, Shuai, and Deep Medhi. "SDN-assisted adaptive streaming framework for tile-based immersive content using MPEG-DASH." In 2017 IEEE Conference on Network Function Virtualization and Software Defined Networks (NFV-SDN), pp. 1-6. IEEE, 2017.

Zhou, Yufeng, Ken Chen, Mei Yu, Hao Jiang, and Gangyi Jiang. "Viewport-adaptive 360-degree video coding using non-uniform tile for virtual reality communication." In Optoelectronic Imaging and Multimedia Technology VI, vol. 11187, p. 1118716. International Society for Optics and Photonics, 2019.

U.S. Pub. Patent Appl. And U.S. Pat. Nos. 8,867,731; 8,914,837; 8,989,367; 9,037,145; 9,065,969; 9,083,770; 9,137,360; 9,152,478; 9,179,096; 9,210,266; 9,247,064; 9,251,371; 9,253,520; 9,300,910; 9,310,977; 9,325,844; 9,342,843; 9,350,867; 9,361,469; 9,380,264; 9,380,266; 9,386,623; 9,392,112; 9,414,225; 9,444,855; 9,449,254; 9,450,968; 9,467,972; 9,485,459; 9,491,206; 9,509,679; 9,514,333; 9,525,718; 9,532,002; 9,537,903; 9,549,152; 9,560,198; 9,584,765; 9,585,549; 9,588,974; 9,590,970; 9,628,275; 9,628,521; 9,628,623; 9,629,532; 9,636,008; 9,641,566; 9,648,060; 9,648,169; 9,654,360; 9,654,563; 9,655,504; 9,660,995; 9,667,635; 9,679,144; 9,681,799; 9,699,199; 9,704,216; 9,710,142; 9,729,492; 9,749,386; 9,756,107; 9,757,020; 9,762,733; 9,769,536; 9,774,687; 9,775,504; 9,781,270; 9,787,379; 9,787,945; 9,794,303; 9,813,523; 9,813,884; 9,825,997; 9,832,176; 9,833,097; 9,838,464; 9,838,760; 9,848,084; 9,854,008; 9,858,279; 9,860,830; 9,861,269; 9,871,967; 9,883,214; 9,887,995; 9,891,803; 9,893,777; 9,894,320; 9,907,463; 9,912,705; 9,912,812; 9,912,813; 9,916,128; 9,916,295; 9,917,868; 9,930,308; 9,936,238; 9,942,519; 9,961,076; 9,961,116; 9,967,161; 9,971,741; 9,979,550; 10,008,190; 10,021,165; 10,021,429; 10,033,967; 10,038,783; 10,046,236; 10,049,086; 10,055,611; 10,057,257; 10,069,876; 10,089,633; 10,102,855; 10,110,526; 10,111,078; 10,116,537; 10,129,510; 10,133,307; 10,136,044; 10,154,138; 10,158,757; 10,171,669; 10,182,093; 10,188,278; 10,194,028; 10,198,777; 10,200,768; 10,205,559; 10,212,198; 10,212,214; 10,212,237; 10,218,665; 10,218,666; 10,225,619; 10,229,126; 10,230,592; 10,235,898; 10,235,898; 10,237,548; 10,238,277; 10,244,031; 10,250,849; 10,257,174; 10,264,413; 10,291,783; 10,298,965; 10,305,869; 10,311,251; 10,311,251; 10,313,341; 10,321,104; 10,321,385; 10,325,599; 10,334,208; 10,334,289; 10,335,031; 10,341,670; 10,353,988; 10,354,256; 10,356,363; 10,367,869; 10,367,870; 10,375,425; 10,375,563; 10,389,694; 10,397,298; 10,397,784; 10,402,932; 10,410,614; 10,412,124; 10,412,206; 10,423,512; 10,425,451; 10,425,697; 10,430,552; 10,440,091; 10,445,051; 10,452,868; 10,455,150; 10,459,534; 10,462,115; 10,462,216; 10,462,658; 10,469,559; 10,469,664; 10,476,812; 10,477,179; 10,482,862; 10,484,539; 10,484,737; 10,490,195; 10,498,794; 10,498,801; 10,498,883; 10,511,766; 10,517,520; 10,521,495; 10,523,627; 10,537,194; 10,542,057; 10,547,937; 10,552,639; 10,558,824; 10,560,502; 10,560,755; 10,574,603; 10,579,244; 10,579,829; 10,587,756; 10,601,995; 10,607,167; 10,607,733; 10,623,700; 10,629,311; 10,638,029; 10,643,664; 10,645,080; 10,650,166; 10,652,293; 10,652,504; 10,652,737; 10,659,501; 10,664,513; 10,673,939; 10,681,092; 10,685,466; 10,686,873; 10,687,917; 10,688,390; 10,694,149; 10,698,578; 10,699,706; 10,701,421; 10,708,320; 10,720,159; 10,733,987; 10,735,268; 10,735,410; 10,740,591; 10,742,725; 10,742,726; 10,747,418; 10,747,717; 10,749,879; 10,749,960; 10,757,258; 10,757,562; 10,762,132; 10,771,524; 10,777,326; 10,779,719; 10,785,511; 10,788,836; 10,788,888; 10,791,113; 10,791,163; 10,796,316; 10,797,884; 10,812,598; 10,826,807; 10,834,514; 10,838,574; 10,841,604; 10,855,755; 10,873,723; 10,898,802; 10,904,325; 10,908,769; 10,917,445; 10,951,672; 10,952,006; 10,958,518; 10,958,721; 10,958,722; 10,977,423; 10,979,671; 10,979,672; 10,984,062; 10,984,237; 10,999,338; 11,005,930; 11,005,931; 11,019,261; 11,032,549; 11,038,933; 11,050,797; 11,063,989; 11,070,768; 11,076,128; 11,076,224; 11,082,662; 11,086,474; 11,089,263; 11,093,103; 11,095,774; 11,095,857; 11,100,197; 11,102,253; 11,102,254; 11,115,532; 11,126,977; 20140040786; 20140072115; 20140079207; 20140086401; 20140126715; 20140143433; 20140157371; 20140177819; 20140181676; 20140211933; 20140214464; 20140233719; 20140293046; 20140355487; 20140372142; 20140372148; 20150004927; 20150006610; 20150006611; 20150012394; 20150016600; 20150033300; 20150039760; 20150052067; 20150063557; 20150082021; 20150088977; 20150103131; 20150113409; 20150117624; 20150117629; 20150127340; 20150142879; 20150149565; 20150188998; 20150189621; 20150199312; 20150207847; 20150229702; 20150237670; 20150254998; 20150261934; 20150264106; 20150271447; 20150278534; 20150281294; 20150281645; 20150288672; 20150288927; 20150310377; 20150312468; 20150350436; 20150350437; 20150350443; 20150365370; 20150373057; 20150373081; 20150381624; 20150381674; 20150382384; 20160004882; 20160005075; 20160005320; 20160006819; 20160006864; 20160021147; 20160029002; 20160036981; 20160036982; 20160036983; 20160037126; 20160044065; 20160056927; 20160072778; 20160103846; 20160112473; 20160135093; 20160139782; 20160142115; 20160142467; 20160142895; 20160149836; 20160149899; 20160149984; 20160150027; 20160156397; 20160165051; 20160173825; 20160173959; 20160179766; 20160180381; 20160191861; 20160192029; 20160219241; 20160219248; 20160219280; 20160235236; 20160267809; 20160277439; 20160278107; 20160285891; 20160285945; 20160295250; 20160321470; 20160323235; 20160330266; 20160330319; 20160337403; 20160337852; 20160353334; 20160373491; 20160373693; 20170024100; 20170026616; 20170034112; 20170039416; 20170060185; 20170078616; 20170103360; 20170104704; 20170104872; 20170104928; 20170118700; 20170123614; 20170124664; 20170132233; 20170134352; 20170139802; 20170142588; 20170163422; 20170171286; 20170193182; 20170195377; 20170200021; 20170208047; 20170208064; 20170228135; 20170230441; 20170237964; 20170242478; 20170244942; 20170250881; 20170250882; 20170257285; 20170264919; 20170272512; 20170277412; 20170282075; 20170340196; 20170340197; 20170340198; 20170347157; 20170353695; 20170354878; 20170359390; 20170359422; 20170366467; 20170366598; 20170374118; 20170374283; 20170374538; 20180018714; 20180020098; 20180034965; 20180034966; 20180035145; 20180049576; 20180054425; 20180054426; 20180063325; 20180081888; 20180084111; 20180091860; 20180091866; 20180109680; 20180109823; 20180113663; 20180115392; 20180125404; 20180130259; 20180144775; 20180164999; 20180173680; 20180174559; 20180176621; 20180183850; 20180184891; 20180191793; 20180191832; 20180191908; 20180192003; 20180192219; 20180205825; 20180225982; 20180227289;

20180227369; 20180232192; 20180232395;
20180241930; 20180241966; 20180255182;
20180260247; 20180262490; 20180263483;
20180270452; 20180288499; 20180293682;
20180294972; 20180309808; 20180310033;
20180322197; 20180324238; 20180336167;
20180336871; 20180342091; 20180342329;
20180345140; 20180349932; 20180352194;
20180375906; 20180376107; 20190005832;
20190015177; 20190018505; 20190020853;
20190020905; 20190028740; 20190044981;
20190045119; 20190052681; 20190057677;
20190058645; 20190058794; 20190068615;
20190068664; 20190068665; 20190069080;
20190075232; 20190083028; 20190114649;
20190138194; 20190140782; 20190141088;
20190141535; 20190150724; 20190156056;
20190156435; 20190156689; 20190158671;
20190158930; 20190166169; 20190182554;
20190189292; 20190190897; 20190207930;
20190212968; 20190213264; 20190222823;
20190230166; 20190230319; 20190230331;
20190235486; 20190238638; 20190258605;
20190261046; 20190261248; 20190268476;
20190282897; 20190289052; 20190291010;
20190297355; 20190310757; 20190310758;
20190310761; 20190313059; 20190319948;
20190340000; 20190340001; 20190340002;
20190340045; 20190342362; 20190342363;
20190342364; 20190342365; 20190342378;
20190347360; 20190349741; 20190366210;
20190373028; 20190377989; 20190392838;
20190394425; 20200005938; 20200007643;
20200021750; 20200021892; 20200036892;
20200036981; 20200076877; 20200077109;
20200085361; 20200117896; 20200125790;
20200126541; 20200129857; 20200129858;
20200137304; 20200137487; 20200139237;
20200153882; 20200162745; 20200162766;
20200162796; 20200186585; 20200186887;
20200204484; 20200204598; 20200205728;
20200211720; 20200218773; 20200219216;
20200219628; 20200225673; 20200227013;
20200227090; 20200228586; 20200233493;
20200236325; 20200241639; 20200250254;
20200250323; 20200250372; 20200252413;
20200262074; 20200267145; 20200267190;
20200272315; 20200275054; 20200279658;
20200280591; 20200280617; 20200296154;
20200298113; 20200301879; 20200304548;
20200304553; 20200313963; 20200316464;
20200322401; 20200344498; 20200366731;
20200382747; 20200389722; 20200396279;
20210029247; 20210044634; 20210044779;
20210044823; 20210051296; 20210058466;
20210064218; 20210075852; 20210084425;
20210117609; 20210120054; 20210152630;
20210165557; 20210166461; 20210200828;
20210203705; 20210227008; 20210240980; and
20210281850.

What is claimed is:

1. A real-time content-adaptive video communication system, comprising:
an input port configured to receive an image stream;
a communication port interfacing with a communication network having a communication latency, configured to:
transmit an oriented projection viewport of the image stream comprising viewed pixels and unviewed pixels by a remote user, the oriented projection viewport being a subset of information in the image stream, and
receive information defining a focus within the image stream based on a previously transmitted portion of the image stream; and
an automated processor, configured to:
analyze the received information defining the focus,
predict the oriented projection viewport within the image comprising the defined focus, comprising prediction of the viewed pixels and the unviewed pixels;
implement a video encoder, having a bandwidth controller with a target resolution and an adaptively adjusted content-dependent quantization parameter, configured to encode the image stream to produce an encoded image stream having the target resolution and an adaptively adjusted content-dependent quantization, wherein the adaptively adjusted content-dependent quantization parameter is selected to respond to an offset magnitude chosen such that a pixel-concentration area's pixel density matches a pixel density of a camera-supplied frame, which has a degraded pixel density away from the pixel concentration area upon determining that the bandwidth controller changes the target resolution; and
adaptively selectively prioritize transmission of predicted viewed pixels over predicted unviewed pixels of the predicted oriented projection viewport of the encoded image stream through the communication port dependent on at least a real-time communication latency constraint.

2. The system according to claim 1, wherein the image stream comprises a panoramic image, comprising an object of interest, and wherein the focus corresponds to the object of interest.

3. The system according to claim 1, wherein the automated processor may be further configured to implement an inertial model to predict changes in the oriented projection viewport.

4. The system according to claim 1, wherein the communication port operates according to an Internet protocol, controlled according to WebRTC.

5. The system according to claim 1, wherein the communication port has a real-time adaptive bitrate.

6. The system according to claim 1, wherein:
the focus is a user-desired focus, and
the automated processor is configured:
to model the image stream, and
to predict the user desired focus based on received information defining a prior actual focus.

7. The system according to claim 1, wherein the received information represents an incremental change in user attention.

8. The system according to claim 1, wherein the transmitted oriented projection viewport comprises an image object, and the automated processor is further configured to adaptively control transmission of a higher image area bit density corresponding to the image object and a lower image area bit density away from the image object.

9. The system according to claim 1, wherein the automated processor is further configured to selectively adaptively allocate image bits in the transmitted oriented projection viewport to areas close to a target pixel-concentration orientation associated with the focus.

10. The system according to claim 1, wherein the automated processor is further configured to selectively adaptively transmit image bits proximate to a target pixel-concentration orientation in a spheric or elliptic projection.

11. The system according to claim 1, wherein the automated processor is further configured to selectively adaptively define at least one of an image resolution and an image bit depth of portions of the oriented projection viewport.

12. The system according to claim 1, wherein the automated processor is further configured to adaptively allocate pixels in respective video frames to represent a selected target pixel-concentration area in preference to other areas in the video frames of the oriented projection viewport of the image stream.

13. The system according to claim 1, wherein the adaptively adjusted content-dependent quantization parameter is selected to respond to an offset magnitude chosen such that a pixel-concentration area's pixel density matches a pixel density of a camera-supplied frame, which has a degraded density away from the pixel concentration area if the bandwidth controller changes the target resolution.

14. The system according to claim 1, wherein the image stream comprises an image in a spheric or elliptic projection, and the automated processor is further configured to transform a portion of the image comprising the oriented projection viewport from the spheric or elliptic projection to the oriented projection viewport of the image.

15. The system according to claim 1, wherein the transmission of the predicted oriented projection viewport of the image stream comprises a header comprising data defining yaw, pitch, and roll.

16. The system according to claim 1, wherein the image stream comprises an image in an offset spherical projection parameterized by an offset vector $\vec{d}, \|\vec{d}\| \in [0,1)$ which describes the offset spherical projection's pixel-concentration direction, each pixel being represented by a unit vector $\vec{p}$ from the center of a sphere to the pixel position, all pixels on the sphere being offset by $\vec{d}$ by applying $$\vec{p}' = \frac{\vec{p} - \vec{d}}{\|\vec{p} - \vec{d}\|},$$

creating a normalized vector $\vec{p}'$,
  wherein the automated processor is further configured to reproject pixels to new locations on the sphere, to obtain a new sphere, and to project pixels on the new sphere to a 2D plane using an equirectangular projection,
  wherein an angle between a pixel vector $\vec{p}$ on the sphere and the offset vector $\vec{d}$ is θ, and after applying the offset, the angle between the new vector $\vec{p}'$ and the offset vector is $$f(\theta) = \arctan \frac{\sin\theta}{-\|\vec{d}\| + \cos\theta},$$

wherein θ has an offset direction selected to match a viewer's predicted future view orientation, and wherein the offset vector has an offset magnitude adaptively selected based on a resolution of the image stream, and a target resolution selected by a bandwidth controller.

17. A real-time content-adaptive video communication method, comprising:
  receiving an image stream comprising a series of images;
  receiving information from a user defining a focus within an image of the image stream through a communication port interfacing with a communication network, based on a previously transmitted portion of the image stream subject to a communication latency;
  automatically analyzing the received information from the user defining the focus, to predict an oriented projection viewport within the image comprising the defined focus;
  encoding the image stream with a video encoder having a bandwidth controller for controlling a bandwidth of an encoded image stream having a target resolution and an adaptively adjusted content-dependent quantization dependent on an adaptively adjusted content-dependent quantization parameter, wherein the adaptively adjusted content-dependent quantization parameter is selected to respond to an offset magnitude chosen such that a pixel-concentration area's pixel density matches a pixel density of a camera-supplied frame, which has a degraded pixel density away from the pixel concentration area upon determining that the bandwidth controller changes the target resolution; and
  transmitting the predicted oriented projection viewport of the encoded image stream through the communication port, which adaptively selectively prioritizes transmission of viewed portions of the predicted oriented projection viewport of the image stream in preference to unviewed portions of the predicted oriented projection viewport of the image stream.

18. A non-transitory computer readable medium comprising instructions for controlling real-time content-adaptive video communications, comprising:
  instructions for receiving an image stream;
  instructions for receiving information defining a focus within an image of the image stream through a communication port interfacing with a communication network, based on a previously transmitted portion of the image stream subject to a communication latency;
  instructions for analyzing the received information defining the focus, to predict viewed pixels and unviewed pixels of the oriented projection viewport within the image comprising the defined focus and define an optimized oriented projection viewport of the image stream;
  instructions for encoding the image stream according to a video encoder to produce an encoded image stream;
  instructions for controlling a bandwidth of the encoded image stream produced by the video encoder, to produce an encoded image stream having a target resolution and an adaptively adjusted content-dependent quantization dependent on an adaptively adjusted content-dependent quantization parameter, wherein the adaptively adjusted content-dependent quantization parameter is selected to respond to an offset magnitude chosen such that a pixel-concentration area's pixel density matches a pixel density of a camera-supplied frame, which has a degraded pixel density away from the pixel concentration area upon determining that the bandwidth controller changes the target resolution; and instructions for adaptively selectively transmitting the optimized oriented projection viewport prioritizing predicted viewed pixels over predicted unviewed pixels through the communication port dependent on at least a real-time communication latency constraint.

* * * * *